(12) United States Patent
Koga

(10) Patent No.: US 12,371,883 B2
(45) Date of Patent: Jul. 29, 2025

(54) SHOVEL MANAGEMENT DEVICE, SHOVEL MANAGEMENT SYSTEM, SHOVEL SUPPORT DEVICE, AND SHOVEL

(71) Applicant: SUMITOMO HEAVY INDUSTRIES, LTD., Tokyo (JP)

(72) Inventor: Masato Koga, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 243 days.

(21) Appl. No.: 17/934,248

(22) Filed: Sep. 22, 2022

(65) Prior Publication Data

US 2023/0014280 A1    Jan. 19, 2023

Related U.S. Application Data

(63) Continuation of application No. PCT/JP2021/011295, filed on Mar. 19, 2021.

(30) Foreign Application Priority Data

Mar. 27, 2020    (JP) .................................. 2020-057513

(51) Int. Cl.
*E02F 9/26* (2006.01)
*G05B 13/02* (2006.01)

(52) U.S. Cl.
CPC .......... *E02F 9/267* (2013.01); *G05B 13/0265* (2013.01)

(58) Field of Classification Search
None
See application file for complete search history.

(56) References Cited

U.S. PATENT DOCUMENTS

| 2010/0070130 | A1 | 3/2010 | Suzuki et al. | |
|---|---|---|---|---|
| 2012/0035802 | A1 | 2/2012 | Suzuki et al. | |
| 2012/0317444 | A1* | 12/2012 | Suzuki | E02F 9/267 714/39 |
| 2014/0052349 | A1* | 2/2014 | Tsukane | E02F 9/267 701/50 |
| 2014/0195184 | A1* | 7/2014 | Maeda | G05B 21/02 702/183 |
| 2014/0279795 | A1* | 9/2014 | Shibuya | G05B 23/0221 706/46 |

(Continued)

FOREIGN PATENT DOCUMENTS

| JP | 2003-034953 | 2/2003 |
|---|---|---|
| JP | 2007-257366 | 10/2007 |

(Continued)

OTHER PUBLICATIONS

International Search Report for PCT/JP2021/011295 mailed on May 25, 2021.

*Primary Examiner* — Anne Marie Antonucci
*Assistant Examiner* — Kyle S Park
(74) *Attorney, Agent, or Firm* — IPUSA, PLLC

(57) ABSTRACT

A shovel management device includes a training part to determine a relationship between operation data of the shovel and an abnormality of the shovel by using, as training data, a data set that includes, among the operation data indicating the operation of the shovel, the operation data corresponding to a period for determining a presence or absence of the abnormality of the shovel as an input and information indicating the absence of the abnormality as an output.

13 Claims, 14 Drawing Sheets

(56) References Cited

U.S. PATENT DOCUMENTS

| | | | | |
|---|---|---|---|---|
| 2014/0351148 A1* | 11/2014 | Yoshikawa | ............ | G06Q 10/20 |
| | | | | 705/305 |
| 2015/0112544 A1* | 4/2015 | Tsukamoto | ............ | G07C 5/008 |
| | | | | 701/33.2 |
| 2015/0169393 A1* | 6/2015 | Shibuya | ............. | G05B 23/0243 |
| | | | | 702/182 |
| 2016/0010313 A1 | 1/2016 | Sugiura et al. | | |
| 2020/0371858 A1 | 11/2020 | Hayakawa | | |
| 2022/0089127 A1* | 3/2022 | Hanaoka | ............ | G06Q 30/0645 |

FOREIGN PATENT DOCUMENTS

| | | |
|---|---|---|
| JP | 2010-236302 | 10/2010 |
| JP | 2015-083731 | 4/2015 |
| JP | 2018-013914 | 1/2018 |
| KR | 10-2010-0049502 | 5/2010 |
| WO | 2014/203990 | 12/2014 |
| WO | 2019/142331 | 7/2019 |

\* cited by examiner

| MACHINE IDENTIFICATION NUMBER | DELIVERY DATE | DELIVERY LOCATION |
|---|---|---|
| XL-0029 | 2018/7/31 | ○○ PREFECTURE ×× CITY |
| XL-0031 | 2016/5/10 | △ PREFECTURE ○ CITY |
| ... | ... | ... |

| MACHINE IDENTIFICATION NUMBER | FAILURE OCCURRENCE DATE | REPAIR START DATE | REPAIR COMPLETION DATE |
|---|---|---|---|
| XL-0029 | 2019/8/10 | 2019/8/11 | 2019/8/15 |
| XL-0031 | 2019/7/15 | 2019/7/15 | 2019/7/15 |
| ... | ... | ... | ... |

FIG.6

| MACHINE IDENTIFICATION NUMBER | ACQUISITION DATE AND TIME | OPERATION DATA | TYPE OF WORK |
|---|---|---|---|
| XL-0029 | 2019/8/20 | OPERATION DATA 1 | NORMAL OPERATION |
| XL-0031 | 2019/8/15 | OPERATION DATA 2 | REPAIR OPERATION |
| ... | ... | ... | ... |

FIG.7

| MACHINE IDENTIFI- CATION NUMBER | DELIVERY DATE | DELIVERY LOCATION | FAILURE OCCURRENCE DATE | REPAIR START DATE | REPAIR COMPLETION DATE | ACQUISITION DATE AND TIME | OPERATION DATA | TYPE OF WORK |
|---|---|---|---|---|---|---|---|---|
| XL-0029 | 2018/7/31 | ○○ PREFECTURE ×× CITY | 2019/8/10 | 2019/8/11 | 2019/8/15 | 2019/8/20 | OPERATION DATA 1 | NORMAL OPERATION |
| XL-0031 | 2016/5/10 | △ PREFECTURE ○ CITY | 2019/7/15 | 2019/7/15 | 2019/7/15 | 2019/8/15 | OPERATION DATA 2 | REPAIR OPERATION |
| ⋮ | ⋮ | ⋮ | ⋮ | ⋮ | ⋮ | ⋮ | ⋮ | ⋮ |

| PARAMETER NAME | DAYS |
|---|---|
| FAILURE APPEARANCE PERIOD | ○○ DAYS |
| POST-REPAIR PRELIMINARY PERIOD | ×× DAYS |
| BUFFER PERIOD | ○× DAYS |

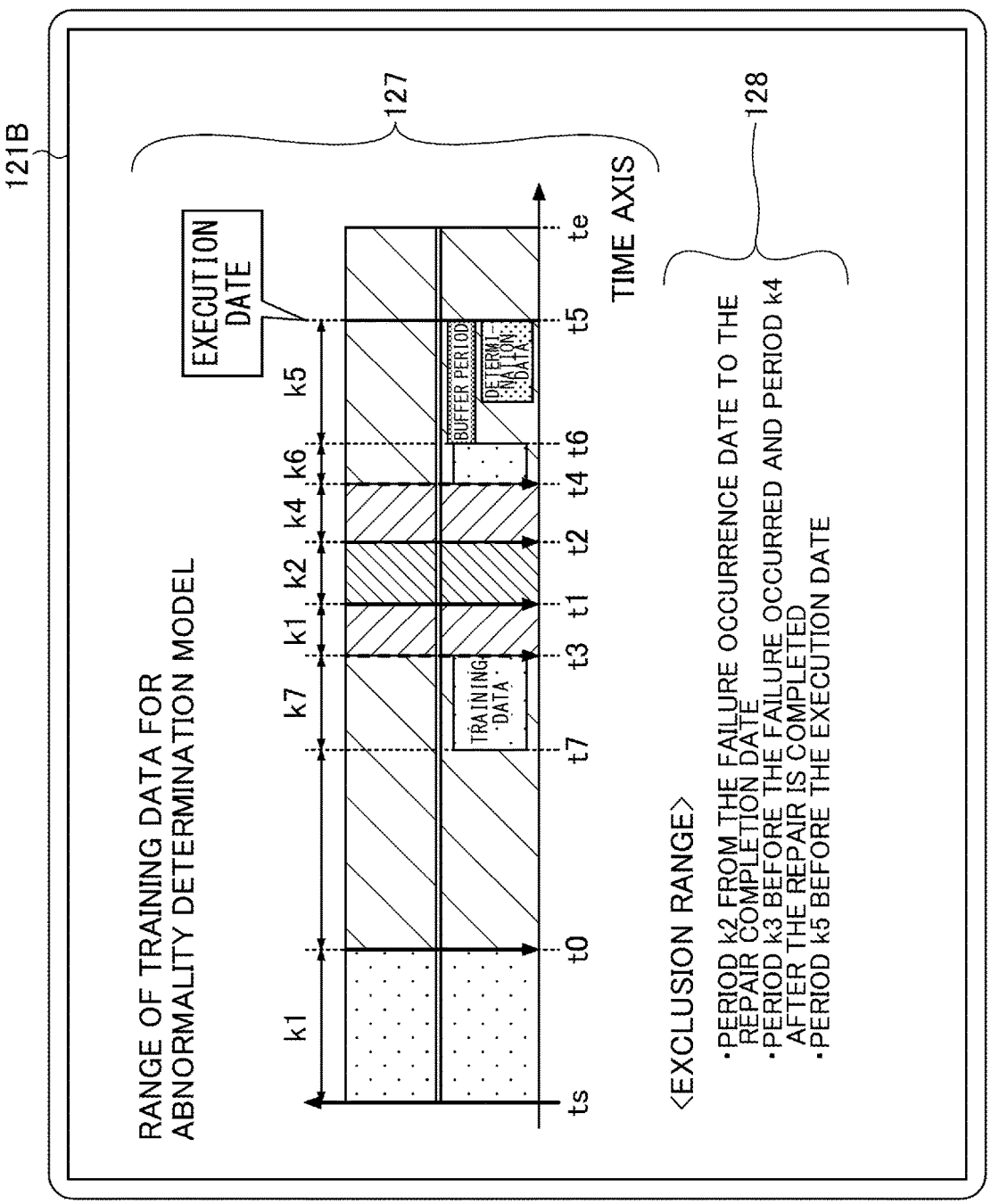

SHOVEL MANAGEMENT DEVICE, SHOVEL MANAGEMENT SYSTEM, SHOVEL SUPPORT DEVICE, AND SHOVEL

CROSS-REFERENCE TO RELATED APPLICATIONS

This U.S. non-provisional application is a continuation of PCT International Application PCT/JP2021/011295 filed on Mar. 19, 2021 and designated the U.S., which is based on and claims priority to Japanese Patent Application No. 2020-057513 filed on Mar. 27, 2020, with the Japan Patent Office. The entire contents of these applications are incorporated herein by reference.

BACKGROUND OF THE INVENTION

1. Field of the Invention

The present invention relates to a shovel management device, a shovel management system, a shovel support device, and a shovel.

2. Description of the Related Art

Techniques for determining whether a work machine is abnormal or not have been known in the past, using multiple reference data representing the operating waveforms of the work machine during normal operation and verification data consisting of a time series of the operating variable features of the work machine.

RELATED-ART DOCUMENTS

Patent Documents

Patent Document 1: Japanese Patent Laid-Open No. 2015-83731

SUMMARY OF THE INVENTION

Problems to be Solved by the Invention

In recent years, there are cases where an abnormality determination model is generated using the operation data of a working machine as training data, and the presence or absence of an abnormality of the working machine is determined using this abnormality determination model.

In this case, the normal operation data of the working machine as training data is usually used, but some of the normal operation data may be inappropriate as training data.

Therefore, in view of the above circumstances, the purpose is to use training data of an appropriate range in the operation data.

Means for Solving the Problems

A shovel management device includes a training part to determine a relationship between operation data of a shovel and an abnormality of the shovel by using, as training data, a data set that includes, among the operation data indicating the operation of the shovel, the operation data corresponding to a period for determining a presence or absence of the abnormality of the shovel as an input and information indicating the absence of the abnormality as an output.

A shovel management system includes: a shovel; and a shovel management device, wherein the shovel management device includes: an information collection part that collects operation data indicating an operation of the shovel from the shovel, and a training part to determine a relationship between operation data of the shovel and an abnormality of the shovel by using, as training data, a data set that includes, among the collected operation data of the shovel, the operation data corresponding to a period for determining a presence or absence of the abnormality of the shovel as an input and information indicating the absence of the abnormality as an output.

In a shovel support device of the present embodiment, the support device accepts an input of a start date of a maintenance of a shovel and a completion date of the maintenance of the shovel, wherein the support device notifies the start date and the completion date to a shovel management device including a training part to determine a relationship between operation data of the shovel and an abnormality of the shovel by using, as training data, a data set that includes, among the operation data indicating the operation of the shovel, the operation data corresponding to a period for determining a presence or absence of the abnormality of the shovel as the input and information indicating the absence of the abnormality as an output.

A shovel support device of the present embodiment includes: a start button to input a start date of a maintenance of the shovel; and a completion button to input a completion date of the maintenance of the shovel.

A shovel that communicates with a management device includes an input device to input a start date of a maintenance of the shovel and a completion date of the maintenance of the shovel; and a communication device that transmits operation data indicating an operation of the shovel and information indicating the start date and the completion date input from the input device to the management device having a training part to determine a relationship between operation data of the shovel and an abnormality of the shovel by using, as training data, a data set that includes, the operation data corresponding to a period for determining a presence or absence of the abnormality of the shovel as an input and information indicating the absence of the abnormality as an output.

In a shovel of the present embodiment, the shovel that communicates with a management device includes a start switch to input a start date of a maintenance of the shovel; and a completion switch to input a completion date of the maintenance of the shovel.

Effects of the Invention

Training data of an appropriate range in the operation data can be used.

BRIEF DESCRIPTION OF THE DRAWINGS

FIG. 4 is a diagram illustrating an example of a master information storage part;

FIG. 5 is a diagram illustrating an example of a failure information storage part;

FIG. 6 is a diagram illustrating of an operation information storage part;

FIG. 7 is a diagram illustrating of a vehicle information storage part;

FIG. 9 is a diagram illustrating an example of parameters held by a parameter holding part;

FIG. 12B is a second diagram illustrating an output example of the result of the abnormality determination.

DETAILED DESCRIPTION OF THE INVENTION

Embodiments

Figure 1:
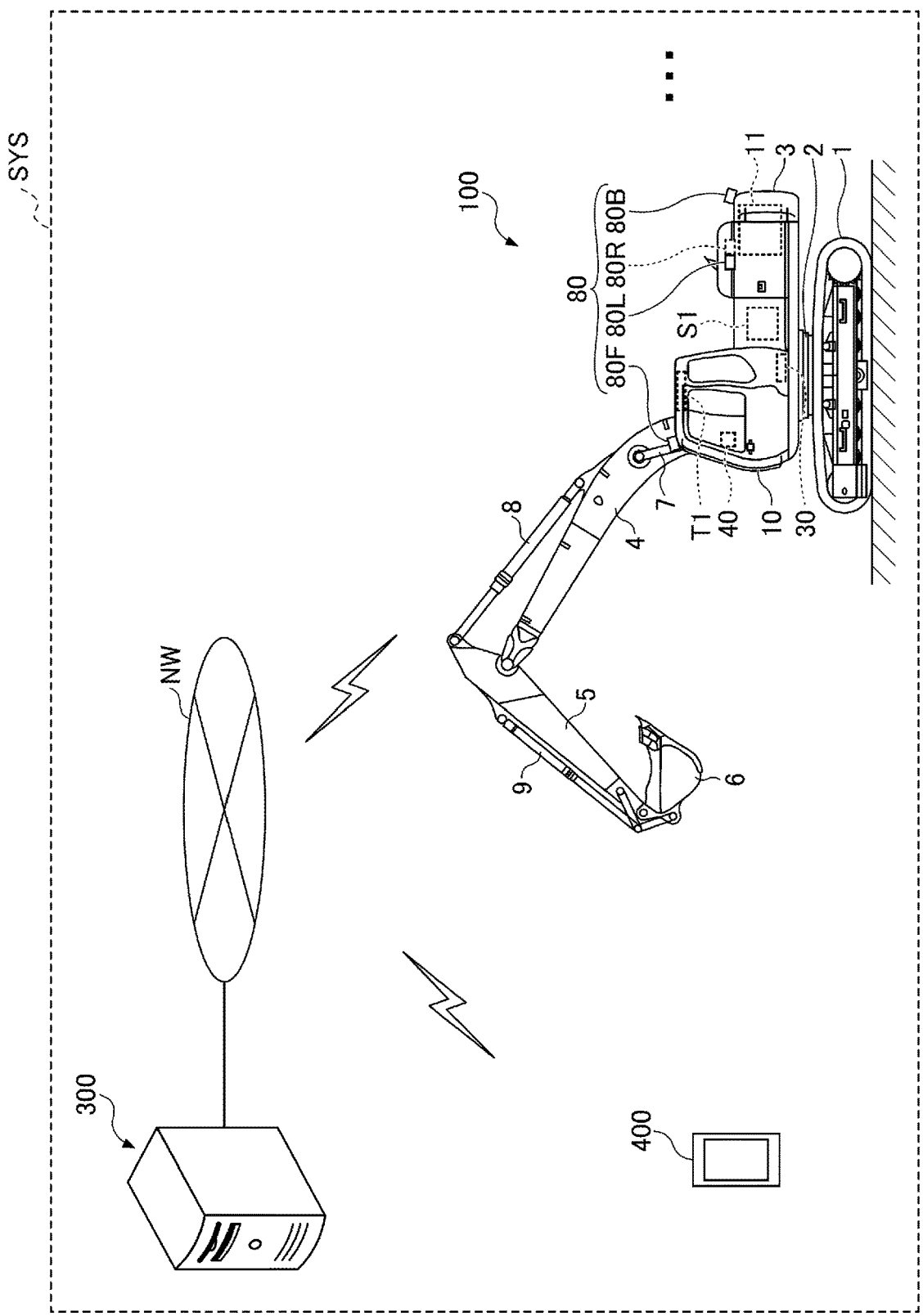
FIG. 1 is a schematic diagram illustrating an example of a shovel management system.

Embodiments will be described below with reference to the drawings. FIG. 1 is a schematic diagram of an example of a shovel management system.

A shovel management system SYS of the present embodiment includes a shovel 100, a management device 300, and a support device 400 for the shovel 100. In the shovel management system SYS, the shovel 100, the management device 300, and the support device 400 communicate with each other via a network. The management device 300 manages the shovel 100. The support device 400 assists the work of the shovel 100. In the following description, the shovel management system SYS is referred to as the management system SYS.

The shovel 100 of the present embodiment is an example of a working machine. The shovel 100 includes a lower traveling body 1, an upper turning body 3 that is mounted to the lower traveling body 1 in a turnably manner through the turning mechanism 2, a boom 4, an arm 5, a bucket 6 as attachments (working device), and a cabin 10.

The lower traveling body 1 includes, for example, a pair of crawlers on the left and right, and each crawler is hydraulically driven by the traveling hydraulic motors 1A and 1B (see FIG. 2), so as to be self-propelling.

The upper turning body 3 is driven by the turning hydraulic motor 2A (see FIG. 2) to turn relative to the lower traveling body 1.

The boom 4 is turnably mounted to the front center of the upper turning body 3 in a vertical direction, the arm 5 is turnably mounted to the distal end of the boom 4 in a vertical direction, and the bucket 6 is turnably mounted to the distal end of the arm 5 in a vertical direction. Boom 4, arm 5, and bucket 6 are hydraulically driven by boom cylinder 7, arm cylinder 8, and bucket cylinder 9, respectively.

The cabin 10 is a cockpit in which an operator rides and is mounted on the left side of the front of the upper turning body 3.

The shovel 100 and the management device 300 communication are communicably interconnected to each other via a predetermined communication network NW including, for example, a mobile communication network having a base station as a terminal, a satellite communication network utilizing an aerial communication satellite, the Internet, or the like.

Further, the management device 300 of the present embodiment acquires the actual information representing the actual operations of the shovel 100 performed by the worker.

Actual information includes actual work patterns (hereinafter referred to as "work pattern performance information") for certain types of work (for example, repeated excavation, loading, finishing, and the like) and actual environmental conditions during work (hereinafter referred to as "environmental condition performance information").

The work pattern refers to a series of types of operations of the shovel 100 when performing a given type of work. Idling is when the shovel 100 is not in operation. For example, the working pattern may include the working locus of the moving element such as the lower traveling body 1, the upper turning body 3, the boom 4, the arm 5, and the bucket 6. Further, the work pattern performance information is specifically, detection information of various sensors representing the work pattern performance information of the shovel 100 when the shovel 100 actually performs a predetermined type of work. The environmental conditions may also include external environmental conditions, such as those associated with the surrounding environment of the shovel 100, as well as internal environmental conditions, such as variable specifications of the shovel 100 (e.g., arm length, bucket type, or the like) that affect the operation of the shovel 100.

When the shovel 100 acquires the work pattern performance information and the environmental condition performance information, it transmits (uploads) various information including the work pattern performance information and the environmental condition performance information to the management device 300.

In the management system SYS, the management device 300 creates an abnormality determination model to determine the presence or absence of an abnormality in the shovel 100 using the work pattern performance information and the environmental condition performance information received from the shovel 100 as training data.

More specifically, the management device 300 identifies the work pattern performance information and the environmental condition performance information to be used for the training data from the work pattern performance information and the environmental condition performance information when the shovel 100 is operating normally. In the following explanation, information including work pattern performance information and environmental condition performance information may be referred to as shovel 100 operation data.

Then, the management device 300 of the present embodiment generates an abnormality determination model by training using the identified operation data as training data, and determines whether the shovel 100 is abnormal or not.

In the example of FIG. 1, the shovel 100 included in the management system SYS is a single shovel, but is not limited thereto. The number of shovels 100 included in the management system SYS may be optional, and all shovels 100 capable of communicating with the management device 300 may be included in the management system SYS.

The management device 300 of the present embodiment is a terminal device installed at a location geographically remote from the shovel 100. The management device 300 is, for example, a server device that is installed in a management center provided outside a work site where the shovel 100 works and is configured mainly by one or more server computers. In this case, the server device may be its own server operated by a business operator operating the management system SYS or an affiliated business operator related to the business operator, or it may be a cloud server.

The support device 400 of the present embodiment may be a portable terminal device such as a smartphone or tablet, for example. When information including, for example, the start date of maintenance of the shovel 100 and the completion date of maintenance is input, the support device 400 transmits the input information to the management device 300.

Figure 2:
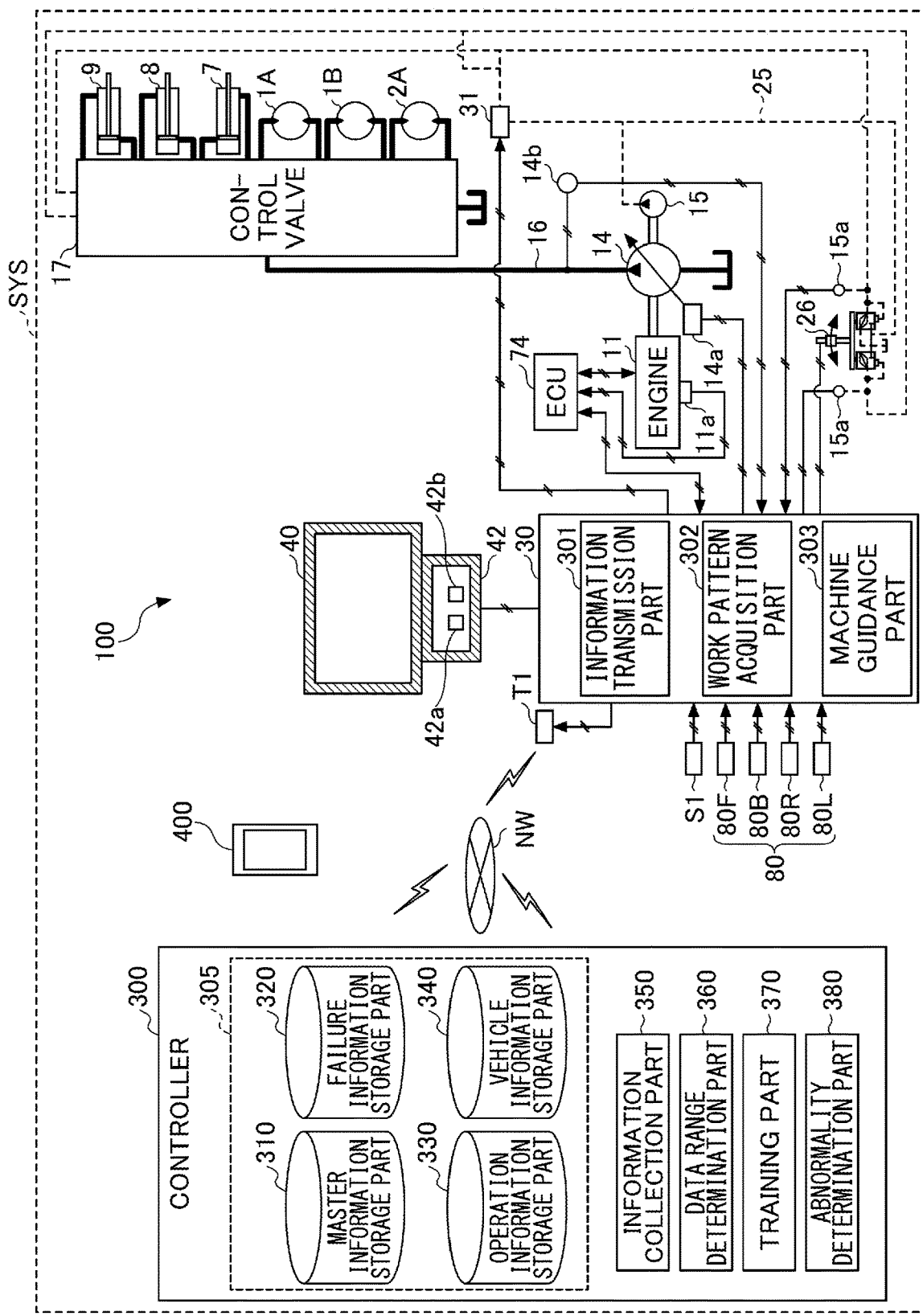
FIG. 2 is a diagram illustrating an example of the shovel management system.

Next, the management system SYS of the present embodiment will be further described with reference to FIG. 2. FIG. 2 is a configuration diagram illustrating an example of a management system of an embodiment of a shovel.

In the figure, the mechanical power line is indicated as a double line, the high-pressure hydraulic line as a thick solid line, the pilot line as a dashed line, and the electric drive and control line as a thin solid line.

The hydraulic drive system for driving the hydraulic actuator of the shovel 100 of the present embodiment includes an engine 11, a main pump 14, a regulator 14a, and a control valve 17. As described above, the hydraulic drive system of the shovel 100 includes hydraulic actuators such as the traveling hydraulic motors 1A and 1B, the turning hydraulic motor 2A, the boom cylinder 7, the arm cylinder 8, and the bucket cylinder 9 for hydraulically driving the lower traveling body 1, the upper turning body 3, the boom 4, the arm 5, and the bucket 6, respectively.

The engine 11 is the main power source in the hydraulic drive system and is mounted, for example, on the rear of the upper turning body 3. Specifically, the engine 11 turns at a predetermined target speed under the control of an engine control unit (ECU) 74, which will be described later, to drive the main pump 14 and the pilot pump 15. The engine 11 is, for example, a diesel engine fueled with diesel oil.

The regulator 14a controls the discharge amount of the main pump 14. For example, the regulator 14a adjusts the angle (tilt angle) of the slope plate of the main pump 14 in response to control instructions from a controller 30.

The main pump 14, for example, like the engine 11, is mounted on the rear of the upper turning body 3 to supply hydraulic oil to the control valve 17 through the high-pressure hydraulic line 16. The main pump 14 is driven by the engine 11 as described above. The main pump 14 is, for example, a variable displacement hydraulic pump, and as described above, under the control of the controller 30, the tilt angle of the slope plate is adjusted by the regulator 14a, thereby adjusting the stroke length of the piston and controlling the discharge flow rate (discharge pressure).

The control valve 17, for example, is mounted in the center of the upper turning body 3 and is a hydraulic operation device which controls the hydraulic drive system in response to an operation by an operator of the operation device 26. As described above, the control valve 17 is connected to the main pump 14 via a high-pressure hydraulic line 16 and selectively supplies hydraulic oil supplied from the main pump 14 to hydraulic actuators (traveling hydraulic motors 1A and 1B, turning hydraulic motor 2A, boom cylinder 7, arm cylinder 8, and bucket cylinder 9) depending on the operating condition of the operation device 26.

Specifically, the control valve 17 includes a plurality of control valves that control the flow rate and flow direction of hydraulic oil supplied from the main pump 14 to each of the hydraulic actuators. For example, the control valve 17 includes a control valve corresponding to the boom 4 (boom cylinder 7). For example, the control valve 17 includes a control valve corresponding to the arm 5 (arm cylinder 8).

For example, the control valve 17 includes a control valve corresponding to the bucket 6 (bucket cylinder 9). For example, the control valve 17 includes a control valve corresponding to the upper turning body 3 (turning hydraulic motor 2A). For example, the control valve 17 includes a right-traveling control valve and a left-traveling control valve corresponding to the right-side crawler and the left-side crawler of the lower traveling body 1.

The operation system of the shovel 100 of the present embodiment includes a pilot pump 15, an operation device 26, and an operation valve 31.

The pilot pump 15 is mounted, for example, on the rear of the upper turning body 3 and provides pilot pressure through the pilot line 25 to the operation device 26 and the operation valve 31. The pilot pump 15 is, for example, a fixed capacitive hydraulic pump driven by the engine 11 as described above.

The operation device 26 is provided near the cockpit of the cabin 10 and is an operation input configuration for the operator to perform the operation of various operation elements (the lower traveling body 1, the upper turning body 3, the boom 4, the arm 5, the bucket 6, and the like). In other words, the operation device 26 is an operation input configuration for the operator to operate the hydraulic actuators (that is, the traveling hydraulic motors 1A and 1B, the turning hydraulic motors 2A, the boom cylinder 7, the arm cylinder 8, the bucket cylinder 9, and the like) driving the respective operating elements. The operation device 26 is connected to a pilot line on its secondary side to the control valve 17.

Thus, the control valve 17 may be input with a pilot pressure corresponding to the operating conditions of the lower traveling body 1, the upper turning body 3, the boom 4, the arm 5, and the bucket 6 of the operation device 26. Thus, the control valve 17 can drive the respective hydraulic actuators according to the operating condition of the operation device 26.

The operation valve 31 adjusts the flow area of the pilot line 25 in response to a control command (for example, control current) from the controller 30. Thus, the operation valve 31 can output the pilot pressure corresponding to the control command to the pilot line on the secondary side using the pilot pressure on the primary side supplied from the pilot pump 15 as the primary pressure.

The operation valve 31 is connected to the right and left pilot ports of the control valves corresponding to the respective hydraulic actuators of the control valve 17 to apply pilot pressure to the pilot ports of the control valve in response to control commands from the controller 30. This allows the controller 30 to supply hydraulic oil discharged from the pilot pump 15 to the pilot port of a corresponding control valve in the control valve 17 via the operation valve 31, even if the operation device 26 is not operated by an operator, thereby allowing the hydraulic actuator to operate.

In addition to the operation valve 31, an electromagnetic relief valve may be provided which relieves the hydraulic tank of excessive hydraulic pressure generated in the hydraulic actuator. Accordingly, it is possible to actively suppress the operation of the hydraulic actuator in the case where the operation amount to the operation device 26 by the operator is excessive. For example, electromagnetic relief valves may be provided to relieve the actuating oil tank of the boom cylinder 7, the arm cylinder 8, and bottom-side oil chamber and rod-side oil chamber of the bucket cylinder 9 from excessive pressure.

The control system of the shovel 100 of the present embodiment includes a controller 30, an ECU 74, a discharge pressure sensor 14b, an operation pressure sensor 15a, a display 40, an input device 42, an imaging device 80, a state detecting device S1, and a communication device T1.

The controller 30 performs drive control of the shovel 100. The controller 30 may implement its functions in any hardware, software, or combination thereof. For example, the controller 30 is configured by a computer including a processor such as a CPU (Central Processing Unit), a storage device such as RAM (Random Access Memory), a non-volatile auxiliary storage device such as ROM (Read Only Memory), and an interface device for various inputs and outputs. The controller 30 implements various functions by executing, for example, various programs installed in the auxiliary storage device on the CPU.

For example, the controller 30 sets a target rotation speed based on a work mode preset by a predetermined operation by an operator or the like and outputs a control command to the ECU 74. Therefore, the controller 30 performs drive control to rotate the engine 11 at a constant speed through the ECU 74.

In addition, for example, the controller 30 outputs a control command to the regulator 14a as needed, and performs what is known as total horsepower control or negative control by changing the discharge amount of the main pump 14.

For example, the controller 30 may have a function to upload various information regarding the shovel 100 to the management device 300 (hereinafter, referred to as "upload function"). Specifically, the controller 30 may transmit (upload) the work pattern performance information and the environmental condition performance information during a predetermined type of work of the shovel 100 to the management device 300 through the communication device T1.

The controller 30 includes an information transmission part 301 as a functional unit related to an upload function that is implemented, for example, by executing one or more programs installed on an auxiliary storage device or the like on a CPU.

Also, for example, the controller 30 performs control regarding a machine guidance function that guides the manual operation of the shovel 100 through the operating device 26 by the operator. The controller 30 may also perform control regarding a machine control function that automatically assists the manual operation of the shovel 100 through the operating device 26 by the operator.

The controller 30 includes a work pattern acquisition part 302 and a machine guidance part 303 as functional parts relating to a machine guidance function and a machine control function, which are implemented, for example, by causing the CPU to execute the one or more programs installed in an auxiliary storage device.

Some of the functions of the controller 30 may be implemented by other controllers (controllers). That is, the functions of controller 30 may be implemented in a manner that is distributed by a plurality of controllers. For example, the machine guidance and machine control functions described above may be implemented by a dedicated controller (controller).

The ECU 74 controls various actuators of the engine 11 (for example, a fuel injection device) in response to a control command from the controller 30 and makes a constant rotation at a set target speed (set speed) of the engine 11 (constant rotation control). At this time, the ECU 74 performs the constant rotation control of the engine 11 based on the rotation speed of the engine 11 detected by an engine speed sensor 11a.

The discharge pressure sensor 14b detects the discharge pressure of the main pump 14. A detection signal corresponding to the discharge pressure detected by the discharge pressure sensor 14b is retrieved by the controller 30.

The operation pressure sensor 15a, as described above, detects the pilot pressure on the secondary side of the operation device 26, that is, the pilot pressure corresponding to the operating state of the respective operating elements (hydraulic actuators) in the operation device 26. A pilot pressure detection signal corresponding to an operational state of elements such as the lower traveling body 1, the upper turning body 3, the boom 4, the arm 5, the bucket 6, and the like in the operation device 26 by the operation pressure sensor 15a is retrieved by the controller 30.

The display 40 is connected to the controller 30 and is provided in a readily visible position from a seated operator within the cabin 10 under the control of the controller 30 to display various information images. The display 40 may be, for example, a liquid crystal display, an organic electroluminescent (EL) display, or the like.

The input device 42 is positioned within reach of a seated operator in the cabin 10 to receive various operations by the operator and output signals corresponding to the operation contents. For example, the input device 42 is integrated with the display 40.

The input device 42 of the present embodiment also includes a switch 42a to be operated when starting maintenance of the shovel 100 and a switch 42b to be operated when maintenance is completed. The switch 42a is an example of a maintenance start switch and is operated by a worker or the like who performs maintenance on the shovel 100. The switch 42b is an example of a maintenance completion switch and is operated by a worker or the like who performed maintenance on the shovel 100.

The switches 42a and 42b of the present embodiment may be displayed on the display of the support device 400, for example. In this case, the switches 42a and 42b may be operated by the user of the support device 400.

The shovel 100 of the present embodiment may, for example, notify surrounding workers or the like, that maintenance has been started, that maintenance has been completed, or the like, by operating the switches 42a and 42b at the start of maintenance (repair) and at the end of maintenance.

In the present embodiment, by operating the switches 42a and 42b, the start date of maintenance and the completion date of maintenance described later in FIG. 5 and FIG. 7 can be specified. In addition to specifying the date, the time may also be specified by operating the switches 42a and 42b.

In addition, if the controller 30 is determined from the image captured by the imaging device 80 that a person exists within a predetermined range from the shovel 100 before the actuator operates, even if the operator operates the control lever, the actuator may be rendered inoperable or at a very low speed. Specifically, when it is determined that a person exists within a predetermined range from the shovel 100, the actuator can be rendered inoperable by locking a gate lock valve (not illustrated). In the case of an electric operating lever, the actuator can be rendered inoperable by disabling the signal from the controller 30 to the operating control valve.

The same is true for other operating levers when operating control valves that an output pilot pressure corresponding to control commands from the controller 30 and apply the pilot pressure to the pilot port of the corresponding control valve in the control valve. When the actuators are to be operated at a very low speed, the actuators can be brought to a very low speed state by reducing the signal from the controller 30 to the control valve for operation.

In this way, when it is determined that the object to be detected exists within a predetermined range, the actuator is not driven even when the operating device is operated, or it performs a low-speed drive with an output smaller than the input to the operating device.

Furthermore, when it is determined that a person exists within a predetermined range from the shovel 100 during the operation of the operating lever by the operator, the operation of the actuator may be stopped or decelerated regardless of the operator's operation. Specifically, when it is determined that a person exists within a predetermined range from the shovel 100, the actuator is stopped by locking the gate lock valve.

When using an operating control valve that outputs a pilot pressure corresponding to a control command from the controller 30 and applies the pilot pressure to the pilot port of the corresponding control valve in the control valve, the actuator can be rendered inoperative by invalidating the signal from the controller 30 to the operating control valve or by outputting a deceleration command. In addition, if the detected object is a truck, stop control is not required.

The actuators are controlled to avoid the detected trucks. In this way, the actuators are controlled based on the easy recognition of the type of object detected.

In addition, the controller 30 stores the location, time, and operation content (running, turning, or the like) when it is determined that a person exists within a predetermined range from the shovel. Here, when a worker approaches the shovel to perform maintenance while the controller 30 is in the ON state, the controller 30 determines that a person is present. However, the approach at this time is to perform maintenance based on normal work.

Therefore, when the worker operates the switch 42*a*, the controller 30 can determine that the approach of the worker after the operation is an approach for performing maintenance, and can store a record indicating that the detection of a person has been determined (location, date and time, operation details, or the like) in association with a record indicating the approach during maintenance. In other words, when the controller 30 is in the ON state and the operation of the switch 42*a* is accepted, the controller 30 determines the approach of a person within a predetermined range as an approach for maintenance. Then, the controller 30 stores information indicating a record of detecting a person approaching within a prescribed range and information indicating that the person is approaching for maintenance in a storage device or the like in association with each other. Information indicating a record in which a person approaching within a prescribed range is detected includes the location, date and time when the person's approach was detected.

The controller 30 of the shovel 100 makes the management device 300 transmit a record (location, date and time, operation details, or the like) indicating that the person detection has been determined and a record indicating that the person is approaching at the time of maintenance in an associated state. Then, when the worker operates the switch 42*b* at the end of the maintenance, the controller 30 determines that the maintenance has been completed, and the association between the record indicating that the detection of a person has been determined and the record indicating that the worker is approaching at the time of maintenance is also terminated. Thus, even if there is a record (location, date and time, or the like) indicating that the person detection has been determined in the management device 300, it can be understood that the factor for determining the person detection is the approach for maintenance.

The input device 42 may be provided separately from the display 40. The input device 42 includes a touch panel mounted on a display of the display 40, a knob switch mounted on the tip of a lever included in the operation device 26, a button switch mounted around the display 40, a lever, a toggle, or the like. A signal corresponding to the operation contents for the input device 42 is retrieved by the controller 30.

An imaging device 80 captures the periphery of shovel 100. The imaging device 80 includes a camera 80F that captures the front side of shovel 100, a camera 80L that captures the left side of shovel 100, a camera 80R that captures the right side of shovel 100, and a camera 80B that captures the rear side of shovel 100.

The camera 80F is mounted, for example, on the ceiling of the cabin 10, that is, inside the cabin 10. The camera 80F may also be attached to the exterior of the cabin 10, such as the roof of the cabin 10, the sides of the boom 4, or the like. The camera 80L is mounted on the upper left end of the upper turning body 3, the camera 80R is mounted on the upper right end of the upper turning body 3, and the camera 80B is mounted on the upper rear end of the upper turning body 3.

The imaging device 80 (cameras 80F, 80B, 80L, 80R) is, for example, a monocular wide-angle camera having a very wide field angle. The imaging device 80 may be a stereo camera, a distance image camera, or the like. Captured images ("peripheral images") around the shovel 100 by the imaging device 80 are retrieved by the controller 30.

The state detecting device S1 outputs detection information regarding various states of the shovel 100. The detection information output from the state detecting device S1 is retrieved by the controller 30.

For example, the state detecting device S1 detects a posture state or an operation state of an attachment. Specifically, the state detecting device S1 may detect the elevation angle of the boom 4, the arm 5, and the bucket 6 (hereinafter, referred to as "boom angle," "arm angle," and "bucket angle," respectively).

That is, the state detecting device S1 may include boom angle sensors, arm angle sensors, and bucket angle sensors that detect boom angle, arm angle, and bucket angle, respectively.

The state detecting device S1 may detect an acceleration, angular acceleration, or the like of the boom 4, the arm 5, and the bucket 6. In this case, the state detecting device S1 may include, for example, a rotary encoder, an acceleration sensor, an angular acceleration sensor, a 6-axis sensor, an Inertial Measurement Unit (IMU) mounted to each of the boom 4, arm 5, and bucket 6, and the like. The state detecting device S1 can also include cylinder sensors that detect the cylinder position, speed, acceleration, or the like of the boom cylinder 7, arm cylinder 8, and bucket cylinder 9 that drive the boom 4, arm 5, and bucket 6, respectively.

In addition, for example, the state detecting device S1 detects the posture of the machine, that is, the lower traveling body 1 and the upper turning body 3. Specifically, the state detecting device S1 may detect a tilted state of the machine with respect to a horizontal plane. In this case, the state detecting device S1 may include, for example, a tilt sensor mounted to the upper turning body 3 and detecting a tilt angle about the twin axes of the upper turning body 3 in a longitudinal direction and a lateral direction (hereinafter, referred to as "forward and backward tilt angles" and "left and right tilt angles").

For example, the state detecting device S1 detects the turning state of the upper turning body 3. Specifically, the state detecting device S1 detects the turning angle speed and the turning angle of the upper turning body 3. In this case, the state detecting device S1 may include, for example, a gyro sensor, a resolver, a rotary encoder, or the like attached to the upper turning body 3. That is, the state detecting device S1 may include a turning angle sensor for detecting the turning angle or the like of the upper turning body 3.

For example, the state detecting device S1 detects the working condition of a force acting on the shovel 100 through an attachment. Specifically, the state detecting device S1 may detect the operating pressure (cylinder pressure) of the hydraulic actuator. In this case, the state detecting device S1 may include a pressure sensor for detecting the pressure in the rod-side oil chamber and bottom-side oil chamber of each of the boom cylinder 7, the arm cylinder 8, and the bucket cylinder 9.

Furthermore, for example, the state detecting device S1 may include a sensor for detecting the displacement of a control valve spool within the control valve 17. Specifically, the state detecting device S1 may include a boom spool displacement sensor for detecting displacement of the boom spool. The state detecting device S1 may also include an arm spool displacement sensor for detecting displacement of the arm spool.

The state detecting device S1 may also include a bucket spool displacement sensor for detecting displacement of the bucket spool. The state detecting device S1 may also include a turning spool displacement sensor for detecting displacement of the turning spool. The state detecting device S1 may also include a right-traveling spool displacement sensor and a left-traveling spool displacement sensor for detecting displacement of the right-traveling spool and the left-traveling spool included in the right-traveling control valve and the left-traveling control valve, respectively.

For example, the state detecting device S1 detects the position of the shovel 100 and the orientation of the upper turning body 3. In this case, the state detecting device S1 may include, for example, a Global Navigation Satellite System (GNSS) compass, a GNSS sensor, an orientation sensor, or the like attached to the upper turning body 3.

A communication device T1 communicates with an external device through the communication network NW. The communication device T1 is, for example, a mobile communication module corresponding to a mobile communication standard such as Long-Term Evolution (LTE), 4th Generation (4G), and 5th Generation (5G), or a satellite communication module for connecting to a satellite communication network.

The information transmission part 301 transmits the work pattern performance information and the environmental condition performance information during a predetermined type of work of the shovel 100 to the management device 300 through the communication device T1.

The work pattern performance information transmitted by the information transmission part 301 includes various detection information input from the state detecting device S1, for example.

The environmental condition performance information transmitted by the information transmission part 301 includes, for example, a peripheral image of the shovel 100 input from the imaging device 80. The environmental condition performance information transmitted by the information transmission part 301 may include information regarding the internal environmental condition of the shovel 100, for example, the variable specification, such as the high-capacity bucket specification, the long arm specification, and the quick coupling specification.

For example, the information transmission part 301 sequentially determines whether or not a predetermined target type work is being performed, and when it is determined that the target type work is being performed, the information transmission part 301 associates the work pattern performance information (that is, various detection information input from the state detecting device S1) and the environmental condition performance information (that is, a peripheral image of the shovel 100 input from the imaging device 80) during the period when the work is being performed and records them in the internal memory or the like.

At this time, the date and time information concerning the start and end of the work of the subject type and the position information of the shovel 100 at the time of the work may be stored in the internal memory in a manner that is further mapped to a set of work pattern performance information and environmental condition performance information. In this case, the datetime information may be obtained, for example, from a predetermined timing configuration Real Time Clock (RTC) within the controller 30. The information transmission part 301 transmits a set of the recorded work pattern performance information and the environmental condition performance information to the management device 300 through the communication device T1 at a predetermined timing such as when the shovel 100 is turned off with the key (stopped). The information transmission part 301 may transmit a set of the recorded work pattern performance information and the environmental condition performance information to the management device 300 through the communication device T1 every time a work of a target type is performed.

The environmental condition performance information may include detection information detected by other sensors mounted on the shovel 100 in place of or in addition to the imaging device 80. For example, the shovel 100 may include other sensors, such as a millimeter wave radar, Light Detecting and Ranging (LIDAR), and the environmental condition performance information may include detection information for these distance sensors. The same shall apply to the current environmental condition information described below.

In addition, the actual environmental condition information may also include weather information. The weather information may include, for example, detection information such as a rain drop sensing sensor, an illumination intensity sensor, or the like that may be included in the state detecting device S1. The information transmission part 301 may transmit only the work pattern performance information to the management device 300.

In addition, the information transmission part 301 may sequentially upload the detection information of the state detecting device S1 or the peripheral image of the shovel 100 by the imaging device 80 to the management device 300 through the communication device T1. In this case, the management device 300 may extract the information when the work of the target type is performed from the information uploaded from the shovel 100 and generate the work pattern performance information and the environmental information.

The work pattern acquisition part 302 acquires the optimum work pattern for the current environmental condition of the predetermined target index from the management device 300 when a predetermined type of work is performed. For example, the work pattern acquisition part 302 transmits a signal (acquisition request signal) requesting the acquisition of a work pattern including information on the current environmental condition of the shovel 100 (hereinafter, referred to as "current environmental condition information") to the management device 300 through the communication device T1 in accordance with a predetermined operation (hereinafter, referred to as "acquisition request operation") by an operator on the input device 42.

This allows the management device 300 to provide the shovel 100 with the optimum work pattern to suit the current environmental conditions of the shovel 100. The current environmental condition information includes, for example, the latest peripheral image of the shovel 100 taken by the imaging device 80.

The current environmental condition information may also include information about the internal environmental conditions of the shovel 100, for example, variable specifications such as high-capacity bucket specifications, long arm specifications, quick coupling specifications, and the like. The current environmental condition information may include detection information, that is, weather information, such as a rain drop sensing sensor or an illumination intensity sensor, which may be included in the state detecting device S1. The work pattern acquisition part 302 acquires information concerning the work pattern that is transmitted from the management device 300 in response to the acquisition request signal and is received by the communication device T1.

The machine guidance part 303 controls the machine guidance function and the machine control function. That is, the machine guidance part 303 assists the operator in operating the various operating elements (the lower traveling body 1, the upper turning body 3, attachments including the boom 4, arm 5, and bucket 6) through the operation device 26.

For example, the machine guidance part 303 may automatically operate at least one of the boom 4 and the bucket 6 so that the predetermined target design plane (hereinafter, referred to simply as "design plane") coincides with the tip of the bucket 6 (e.g., the claw or the back surface) when the operation of the arm 5 is performed by the operator through the operation device 26.

In addition, the machine guidance part 303 may automatically operate the arm 5 regardless of the operation state of the operation device 26 which operates the arm 5. That is, the machine guidance part 303 may trigger an operator's operation of the operation device 26 to cause an attachment to perform a predetermined operation.

More specifically, the machine guidance part 303 acquires various information from the state detecting device S1, the imaging device 80, the communication device T1, the input device 42, and the like. The machine guidance part 303 calculates the distance between the bucket 6 and the design plane, for example, based on the acquired information. The machine guidance part 303 can automatically operate the hydraulic actuators by appropriately controlling the operation valve 31 according to the distance between the calculated bucket 6 and the design plane and adjusting the pilot pressure acting on the control valve corresponding to the hydraulic actuator individually and automatically.

The operation valve 31 includes, for example, a boom proportional valve corresponding to the boom 4 (boom cylinder 7). The operation valve 31 includes, for example, an arm proportional valve corresponding to the arm 5 (arm cylinder 8). The operation valve 31 includes, for example, a bucket proportional valve corresponding to the bucket 6 (bucket cylinder 9). The operation valve 31 includes, for example, a turning proportional valve corresponding to the upper turning body 3 (turning hydraulic motor 2A). The operation valve 31 includes, for example, a right-traveling proportional valve and a left-traveling proportional valve corresponding to the right-side crawler and the left-side crawler of the lower traveling body 1.

The machine guidance part 303 may, for example, automatically expand or contract at least one of the boom cylinders 7, the arm cylinder 8, and the bucket cylinder 9, depending on the opening and closing operation of the arm 5 relative to the operation device 26 to assist in the excavation work.

The excavation work is the work of excavating the ground along the design plane with the claw of the bucket 6. The machine guidance part 303 automatically expands and contracts at least one of the boom cylinders 7 and the bucket cylinder 9, for example, when an operator manually operates the arm 5 in the closing direction (hereinafter, referred to as "arm closing operation") with respect to the operation device 26.

In addition, the machine guidance part 303 may also automatically expand or contract at least one of the boom cylinders 7, the arm cylinder 8, and the bucket cylinder 9 to assist in finishing, for example, the slope or horizontal surface. Finishing operations include, for example, pulling the bucket 6 forward along the design plane while pressing the back side of the bucket 6 against the ground.

The machine guidance part 303 automatically expands and contracts at least one of the boom cylinders 7 and the bucket cylinder 9, for example, when an operator manually closes the arm relative to the operation device 26. This allows the bucket 6 to be moved along the design plane that is the slope or horizontal plane after completion while pressing the back surface of the bucket 6 against the pre-completion slope (slope surface) or horizontal surface with a predetermined pressing force.

In addition, the machine guidance part 303 may automatically rotate the turning hydraulic motor 2A to make the upper turning body 3 directly face the design plane. In this case, the machine guidance part 303 may operate a predetermined switch included in the input device 42 so that the upper turning body 3 is directly facing to the design plane. The machine guidance part 303 may also have the upper turning body 3 directly facing to the design plane and initiate the machine control function only when a predetermined switch is operated.

For example, when a predetermined type of work (for example, excavation work, loading work, finishing work, and the like) is performed, the machine guidance part 303 controls the operation of at least a part of the attachment, the upper turning body 3, and the lower traveling body 1 in accordance with the operation by the operator to the operation device 26 in accordance with the work pattern (the optimum work pattern) acquired by the work pattern acquisition part 302.

This allows the operator to adjust the operation of the shovel 100 to a predetermined target index, for example, an optimum work pattern for the environmental conditions of the current shovel 100 output from the management device 300 so that the evaluation of the speed of the work is relatively high, regardless of the degree of skill with which the shovel 100 is operated.

The machine guidance part 303 may also allow an operator to display on the display 40 the operation of the shovel 100 corresponding to the optimum operation pattern while controlling the operation of the shovel 100 based on the optimum operation pattern. For example, when the operation of the shovel 100 is controlled based on the optimum operation pattern, the machine guidance part 303 displays the video of the simulation results corresponding to the optimum operation pattern on the display 40. Accordingly, the operator can proceed with the work while checking the contents of the actual work pattern with the video of the display 40.

The management device 300 of the present embodiment includes a master information storage part 310, a failure information storage part 320, an operation information storage part 330, a vehicle information storage part 340, an information collection part 350, a data range determination part 360, a training part 370, and an abnormality determination part 380.

Master information for identifying the shovel 100 is stored in the master information storage part 310. Failure information relating to failures of the shovel 100 is stored in the failure information storage part 320. Operation information relating to the operation of the shovel 100 transmitted from the shovel 100 is stored in the operation information storage part 330. The operation information includes operation data of the shovel 100. Vehicle information in association with master information, failure information, and operation information for each shovel 100 is stored in the vehicle information storage part 340. Details of each of the storage part described above will be described later.

The information collection part 350 of the present embodiment collects information stored in the master information storage part 310, the failure information storage part 320, and the operation information storage part 330 and stores them in each storage part. The information collection part 350 associates the collected information with each other to make it vehicle information and stores it in the vehicle information storage part 340. Specifically, the information collection part 350 communicates with a system managed by a sales company that sells shovels 100 and a system managed by a maintenance company that maintains shovels 100 to collect master information and failure information. In addition, the information collection part 350 collects operation information from the shovel 100. Then, the information collection part 350 stores the vehicle information corresponding to the master information, the failure information, and the operation information in the vehicle information storage part 340.

Based on the vehicle information stored in the vehicle information storage part 340 and the period for determining whether or not the shovel 100 is abnormal, the data range determination part 360 determines the range for which the training data is to be input the training part 370 in the operation data included in the operation information stored in the operation information storage part 330.

Based on the training data, the training part 370 trains the relationship between the operation data of the shovel 100 and the presence or absence of an abnormality in the shovel 100. Specifically, the training part 370 generates an abnormality determination model that associates with the input operation data and the presence or absence of an abnormality in the shovel 100, based on the operation data (training data) when the shovel is considered to be in a normal state.

Based on the output of the abnormality determination model, an abnormality determination part 380 determines the presence or absence of an abnormality in the shovel 100 and outputs the determination result.

Figure 3:
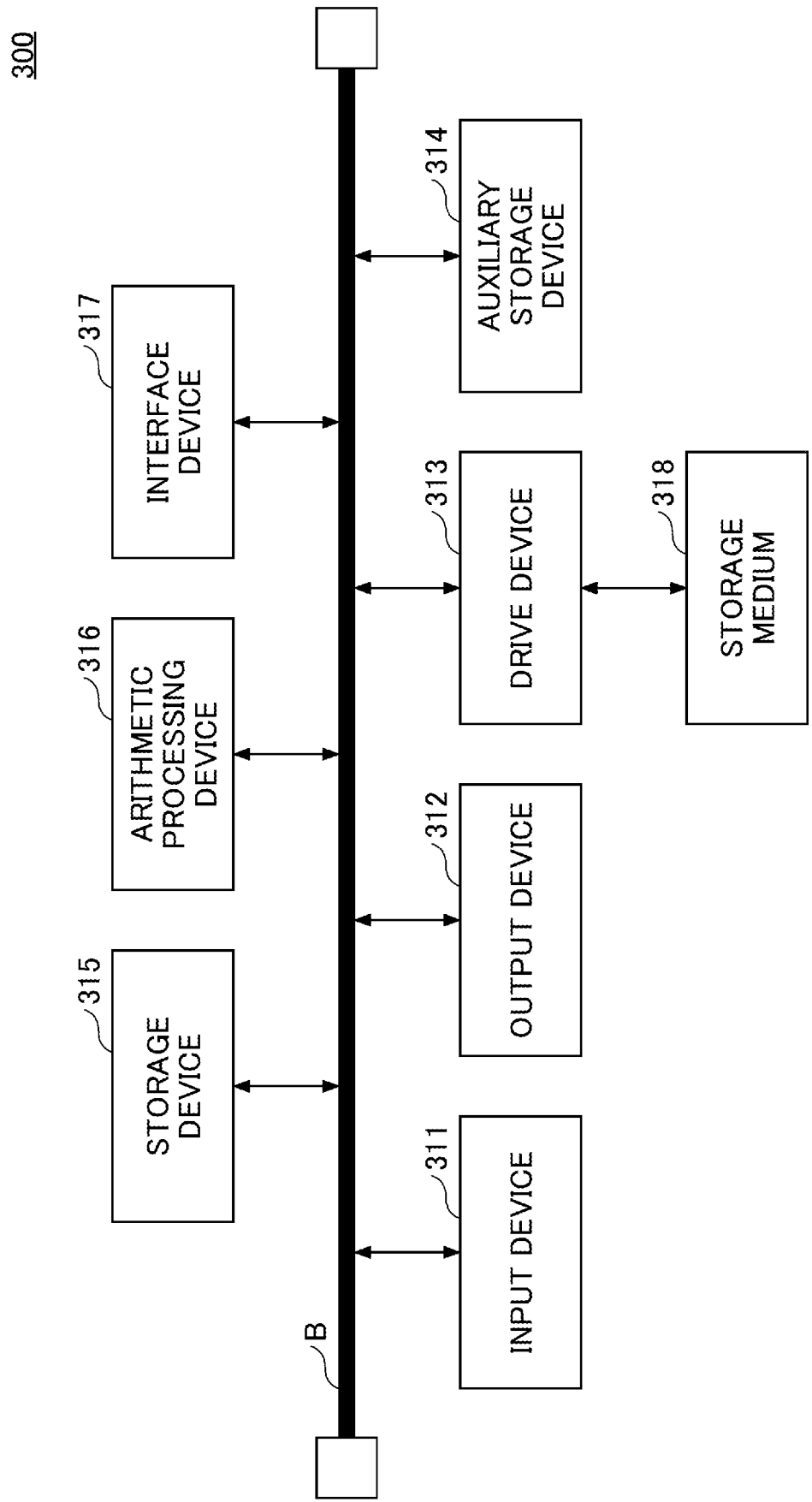
FIG. 3 is a diagram illustrating an example of a hardware configuration of a management device.

Hereinafter, the management device 300 of the present embodiment will be described. FIG. 3 is a diagram illustrating an example of a hardware configuration of the management device of the present embodiment.

The management device 300 of the present embodiment is a computer including an input device 311, an output device 312, a drive device 313, an auxiliary storage device 314, a storage device 315, an arithmetic processing device 316, and an interface device 317, each of which is interconnected by a Bus B.

The input device 311 is a device for inputting various kinds of information and is realized by, for example, a keyboard or a pointing device. The output device 312 is for outputting various kinds of information and is realized by, for example, a display. The interface device 317 includes a LAN card or the like and is used to connect to the network.

The programs that realize the information collection part 350, the data range determination part 360, the training part 370, and the abnormality determination part 380 of the management device 300 are at least some of the various programs that control the management device 300. The programs are provided by, for example, distribution of a storage medium 318 or downloading from the network. Various types of storage media can be used for the storage medium 318 on which the program is recorded, such as a CD-ROM, a flexible disk, a magneto-optical disk, or the like, which records information optically, electrically or magnetically, or a semiconductor memory, or the like, which records information electrically, such as ROMs, flash memories, and the like.

When the storage medium 318 recording the program is set in the drive device 313, the program is installed from the storage medium 318 to the auxiliary storage device 314 via the drive device 313. The programs and programs downloaded from the network are installed in the auxiliary storage device 314 via the interface device 317.

The auxiliary storage device 314 realizes each storage part and the like of the management device 300, and stores programs installed in the management device 300, as well as various necessary files, data, and the like by the management device 300. The storage device 315 reads and stores the program from the auxiliary storage device 314 when the management device 300 starts. The arithmetic processing device 316 implements various types of processing as described below according to the program stored in the storage device 315.

Next, each storage part of the management device 300 will be described with reference to FIGS. 4 to 7. FIG. 4 illustrates an example of the master information storage part.

The master information stored in the master information storage part 310 of the present embodiment includes, as information items, a machine identification number, a delivery date, and a delivery location, and the item "Machine identification number" is associated with the other items.

The master information in the present embodiment is information including the values of the items "Machine identification number", "Delivery date", and "Delivery location". The master information in the present embodiment is information managed by, for example, a sales company of a shovel 100, which is collected by an information collection part 350 and stored in a master information storage part 310.

The value of the item "Machine identification number" is identification information for identifying the shovel 100. The value of the item "Delivery date" indicates the date when the shovel 100 was delivered to the company and the like that purchased or rented the shovel. The value of the item "Delivery date" may also be the date of delivery to the work site where the work using the shovel 100 is performed.

The value of the item "Delivery location" indicates the location of the work site where work using the shovel 100 will be performed. The value of the item "Delivery location"

may also indicate the location of the company that purchased or rented the shovel 100. The master information storage part 310 may include position information such as latitude and longitude indicating the position of the work site where the work by the shovel 100 is performed.

FIG. 5 is a diagram illustrating an example of the failure information storage part. The failure information stored in the failure information storage part 320 has, as information items, a machine identification number, a failure occurrence date, a repair start date, and a repair completion date, and the item "Machine identification number" is associated with the other items.

The failure information in the present embodiment is information including the values of the items "Machine identification number", "Failure occurrence date", "Repair start date", and "Repair completion date". Failure information in the present embodiment is, for example, information managed by a company or the like that manages the maintenance of the shovel 100 and is collected by an information collection part 350 and stored in a failure information storage part 320.

The value of the item "Failure occurrence date" indicates the date when the failure of operation occurred in the shovel 100. More specifically, the value of the item "Failure occurrence date" may indicate, for example, the date on which the worker of the shovel 100 noticed the failure occurrence date and notified the maintenance company and the like, of the failure occurrence date. In addition, the value of the item "Failure occurrence date" may indicate, for example, the date on which the failure of shovel 100 is confirmed by a worker performing maintenance on the shovel 100.

The value of the item "Repair start date" indicates the date when the repair (maintenance) of shovel 100 is started. Specifically, the value of the item "Repair start date" indicates the date when the switch 42a is operated by a worker or the like performing maintenance on the shovel 100.

The value of the item "Repair completion date" indicates the date when the repair (maintenance) of shovel 100 is completed. Specifically, the value of the item "Repair completion date" indicates the date when the switch 42b is operated by the worker who performed maintenance on the shovel 100.

In this way, the management device 300 of the present embodiment manages the maintenance start date and the completion date in association with the failure occurrence date, so that the administrator of the management system SYS can grasp the period from the occurrence of the failure to the start of the maintenance, the number of days required for the maintenance or the like.

FIG. 6 illustrates an example of the operation information storage part. The operation information stored in the operation information storage part 330 of the present embodiment includes, as information items, the machine identification number, acquisition date and time, operation data, and presence or absence of a repair operation, and the item "Machine identification number" is associated with the other items.

The operation information in the present embodiment is information including the values of the items "Machine identification number", "Acquisition date and time", "Operation data", and "Type of work". The operation information in the present embodiment is information transmitted by the information transmission part 301 of the shovel 100 through the communication device T1, and is received by the information collection part 350 and stored in the operation information storage part 330.

The value of the item "Acquisition date and time" indicates the date and time when the operation data is acquired. The value of the item "Operation data" is information transmitted from the shovel 100, including actual work pattern information and actual environmental condition information. In other words, the value of the item "Operation data" is information including various kinds of detection information output from the state detecting device S1, which indicates the operation of the shovel 100.

The value of the item "Type of work" indicates the type of work being performed by the shovel 100. Specifically, the value of the item "Type of work" indicates whether the work being performed by the shovel 100 is normal operation or repair operation. The repair operation of the shovel 100 is, for example, the work (operation) performed in the process of repairing the shovel 100.

FIG. 7 illustrates an example of the vehicle information storage part.

The information collection part 350 of the present embodiment collects master information, failure information, and operation information from each of the master information storage part 310, failure information storage part 320, and operation information storage part 330 for each machine identification number, and stores the vehicle information corresponding to the information in the vehicle information storage part 340. Therefore, vehicle information can be said to be information generated by the information collection part 350.

The vehicle information in the present embodiment includes, as information items, the machine identification number, delivery date, delivery location, failure date, repair completion date, acquisition date and time, operation data, and type of work, and the item "Machine identification number" is associated with the other items.

The vehicle information in the present embodiment is information including the values of the items "Machine identification number", "Delivery date", "Delivery location", "Failure occurrence date", "Repair start date", "Repair completion date", "Acquisition date and time", "Operation data", and "Type of work".

In the example of FIG. 7, it can be seen that the shovel 100 identified by the machine identification number "XL-0029" is delivered to OO prefecture (OO indicates a specific name of a prefecture), XX city (XX indicates a specific name of a city) on Jul. 31, 2018, had a failure on Aug. 10, 2019, started repair on Aug. 11, 2019, and is completed on Aug. 15, 2019. In addition, the operation data of the shovel 100, which is identified by the machine identification number "XL-0029", is acquired during normal operations on Aug. 20, 2019.

It should be note that the symbols indicated in the specification or drawings refer to a specific name or number.

Figure 8:
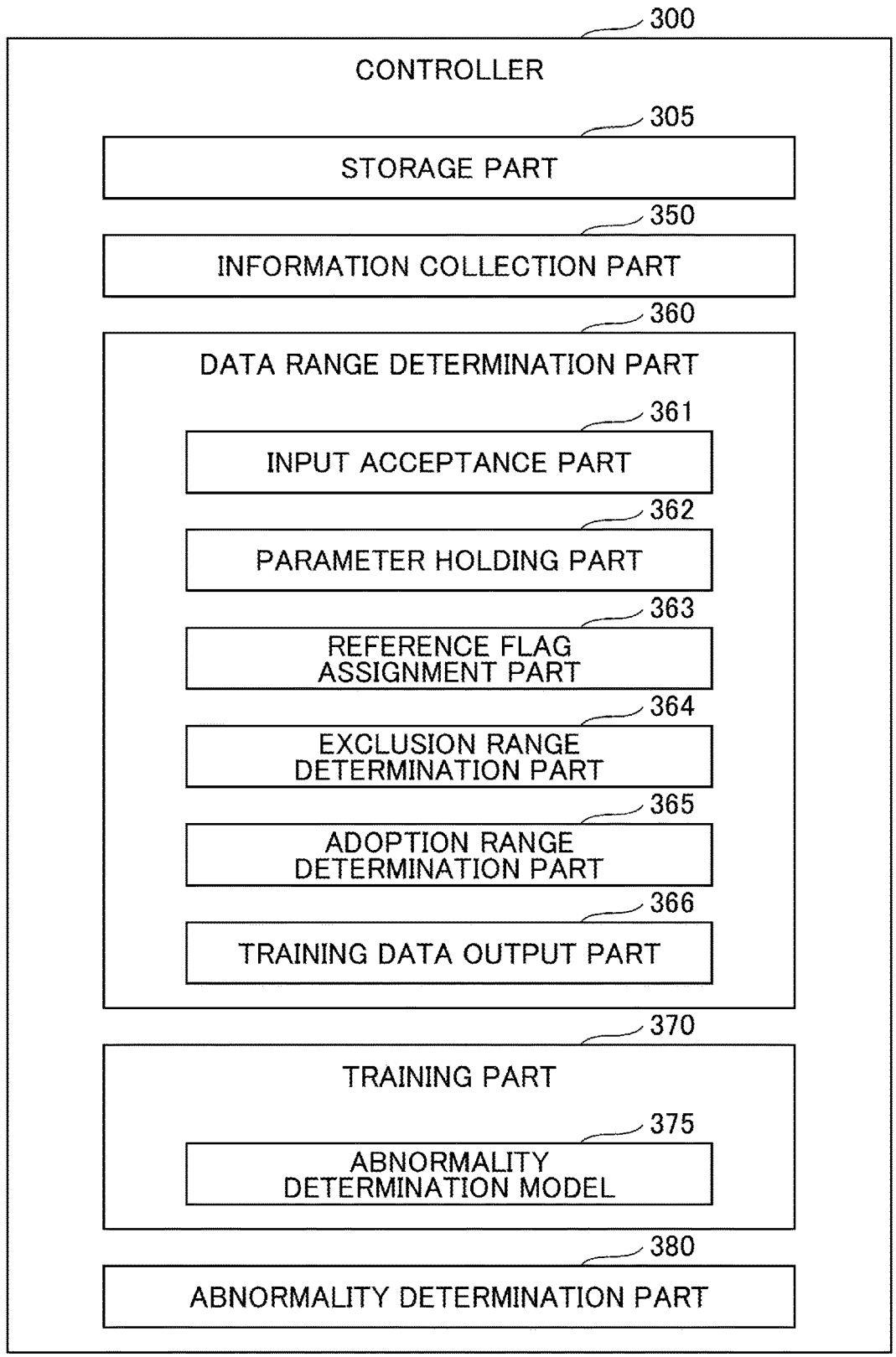
FIG. 8 is a diagram illustrating functions of the management device.

Next, with reference to FIG. 8, the functions of the management device 300 of the present embodiment will be described. FIG. 8 illustrates the functions of the management device.

The management device 300 of the present embodiment has the storage part 305, the information collection part 350, the data range determination part 360, the training part 370, and the abnormality determination part 380.

The storage part 305 is realized by, for example, the auxiliary storage device 314 or the storage device 315. In addition, the information collection part 350, the data range determination part 360, the training part 370, and the abnormality determination part 380 are realized when the arithmetic processing device 316 reads and executes a program stored in the storage device 315 and the like.

The information collection part 350 of the present embodiment collects master information, failure information, and operation information, and stores them in the master information storage part 310, the failure information storage part 320, and the operation information storage part 330, respectively. In addition, the information collection part 350 generates vehicle information in which master information, failure information, and operation information are associated with each machine identification number of the shovel 100, and stores the information in the vehicle information storage part 340.

In the operation data, the data range determination part 360 determines a range to be used as training data for training by the training part 370. The data range determination part 360 is described below.

The data range determination part 360 includes an input acceptance part 361, a parameter holding part 362, a reference flag assignment part 363, an exclusion range determination part 364, an adoption range determination part 365, and a training data output part 366.

The input acceptance part 361 accepts various inputs to the management device 300. Specifically, the input acceptance part 361 accepts the input information indicating the period for performing abnormality determination, which will be described later. The information indicating when the abnormality determination is to be performed indicates the day on which the abnormality determination processing by the abnormality determination part 380 is to be performed. In the following explanation, the date on which the abnormality determination processing is executed is sometimes referred to as the execution date.

The parameter holding part 362 holds parameters referred by the exclusion range determination part 364 and the adoption range determination part 365. The parameters held by the parameter holding part 362 may be freely set by the administrator of the management system SYS and the like. Details of the parameters held in the parameter holding part 362 will be described later.

The reference flag assignment part 363 determines a first exclusion range in the operation data that cannot be the training data by referring to the vehicle information, and assigns a flag based on the first exclusion range to the operation data.

The exclusion range determination part 364 determines a second exclusion range based on the parameters stored in the parameter holding part 362 and the first exclusion range.

That is, the reference flag assignment part 363 and the exclusion range determination part 364 in the present embodiment are examples of range determining parts that determine the range excluded from the training data in the operation information included in the vehicle information.

With reference to the parameters stored in the parameter holding part 362 and the second exclusion range, the adoption range determination part 365 determines the range of operation data to be adopted for the training data on the basis of the time when the abnormality determination received by the input acceptance part 361 is performed.

In the following explanation, the range of operation data determined by the adoption range determination part 365 may be referred to as training data. In other words, the training data is the operation data acquired during the period determined by the adoption range determination part 365.

A training data output part 366 outputs training data to the training part 370.

The training part 370 performs training using the training data as input, and generates an abnormality determination model 375. That is, the training part 370 includes as training data, a data set that includes, among the operation data indicating the operation of the shovel 100, the operation data corresponding to a period for determining a presence or absence of the abnormality of the shovel as an input and information indicating the absence of the abnormality as an output to generate the abnormality determination model 375. In other words, the training part 370 generates an abnormality determination model that associates the input operation data with the degree of abnormality of the shovel 100, using a data set whose output is the normal operation data and information indicating non-abnormality.

When the operation data to be subjected to the abnormality determination processing is input, the training part 370 uses the operation data as an input to the abnormality determination model 375 to obtain an index value indicating the presence or absence of the abnormality of the shovel 100. In the following explanation, the operation data regarded as the input of the abnormality determination model 375 is sometimes referred to as determination data.

The training part 370 of the present embodiment may use machine training as a training method, for example. Machine training techniques include deep training, autoencoders, support vector machines (SVMs), and the like.

The abnormality determination part 380 refers to the information indicating when the abnormality determination is to be performed and the parameter to specify the range of operation data to be used for the abnormality determination, and causes the specified operation data to be input to the training part 370 as data for determination.

Also, the abnormality determination part 380 determines the presence or absence of an abnormality in the shovel 100 based on the index value output from the training part 370. Specifically, for example, the abnormality determination part 380 may determine that there is an abnormality when the index value output from the training part 370 is greater than a predetermined threshold.

In the present embodiment, the determination by the abnormality determination part 380 may be executed, for example, during the warm-up mode, during the automatic regeneration mode, during the manual regeneration mode, during the cooling operation of the supercharger of the engine 11 (during the turbo cooling mode), or the like.

In the present embodiment, the range of operation data used for the training data may indicate the range on the time axis, and the range used for the determination data may indicate the number of pieces of operation data.

Specifically, the training data may be a group of operation data acquired during the period determined by the adoption range determination part 365. In addition, the determination data may be an operation data group including a predetermined number of operation data acquired before the day on which the abnormality determination is performed.

Next, the parameters held by the parameter holding part 362 will be described with reference to FIG. 9. FIG. 9 illustrates an example of the parameters held by the parameter holding part.

For example, the parameter holding part 362 may hold parameter names and values in association with each other.

In the example of FIG. 9, the parameter holding part 362 holds OO days (OO indicates a certain number of days in FIG. 9) as the failure appearance period, XX days (XX indicates a certain number of days in FIG. 9) as the post-repair preliminary period, and OX days (Ox indicates a certain number of days in FIG. 9) as the buffer period.

The failure appearance period is a parameter set in consideration of the possibility that the failure appeared in the operation of the shovel 100 prior to the failure occurrence date. Specifically, for example, it may take several days after a failure appears in the shovel 100 before the operator notices the failure and notifies the maintenance company of the occurrence of the failure. In such a case, a failure has occurred in the operation of the shovel 100 even before the day when the failure occurred, and consequently the operation data during this period is inappropriate as training data.

The post-repair preliminary period is a parameter set taking into consideration the possibility that the operation of the shovel 100 immediately after completion of the repair differs from the normal operation or the possibility that the actual repair completion date does not match the repair completion date entered into the system. Specifically, for example, once a repair has been completed, the repair completion date is entered, and then additional parts to be repaired are found. In this case, the operation of the shovel 100 immediately after the entered repair completion date may be different from the normal operation, and consequently the operation data during this period is inappropriate as training data.

The buffer period is a parameter set in consideration of separating the determination data from the training data. For example, if the time when the operation data used as the determination data is acquired and the operation data used for the training data is acquired are close, the training data and the determination data may be similar.

In this case, the abnormality determination model 375 is generated by training data similar to the determination data. Therefore, even if there is an abnormality in the operation of the shovel 100, it may be regarded as a normal state, and improvement in the accuracy of detecting the abnormality may be hindered.

The parameter holding part 362 of the present embodiment holds parameters set in consideration of the above.

Figure 10:
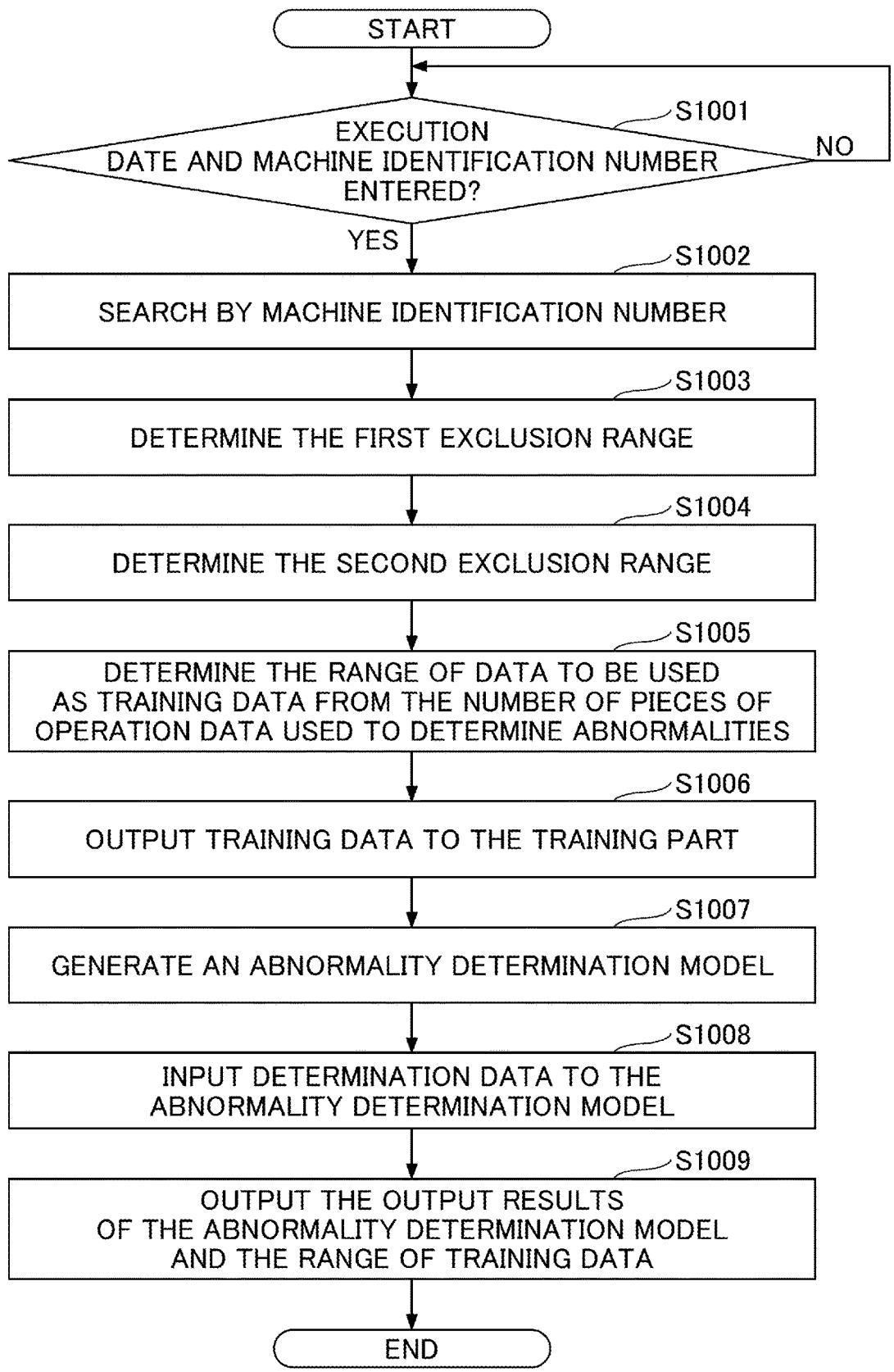
FIG. 10 is a flow chart illustrating the processing of the management device.

Next, the processing of the management device 300 of the present embodiment will be described with reference to FIG. 10. FIG. 10 is a flowchart illustrating the processing of the management device.

The management device 300 of the present embodiment uses the input acceptance part 361 of the data range determination part 360 to determine whether or not the execution date and machine identification information have been accepted (Step S1001). In the present embodiment, only the machine identification number of the shovel 100 to be subjected to the failure determination processing may be input.

If the execution date and the machine identification information are not accepted in Step S1001, the management device 300 waits until the execution date is accepted.

When the execution date and machine identification information are accepted in step S1001, the data range determination part 360 searches the vehicle information storage part 340 by the machine identification number (Step S1002).

Then, the data range determination part 360 determines the first exclusion range that cannot be the training data in the operation data included in the vehicle information by the reference flag assignment part 363 with reference to the vehicle information acquired as a result of the retrieval in Step S1002 (Step S1003). The reference flag assignment part 363 assigns a flag based on the first exclusion range to the operation data.

Then, the data range determination part 360 determines the second exclusion range by the exclusion range determination part 364 on the basis of the failure appearance period stored in the parameter holding part 362, the post-repair preliminary period, and the first exclusion range (Step S1004).

Then, the data range determination part 360 determines the range of operation data to be adopted as training data based on the number of pieces operation data to be used as determination data and the buffer period stored in the parameter holding part 362 by the adoption range determination part 365 (Step S1005).

Then, the data range determination part 360 extracts the operation data in the range determined in Step S1005 as training data by the training data output part 366, and outputs the training data to the training part 370 (Step S1006).

Then, the training part 370 of the management device 300 generates an abnormality determination model 375 based on the training data (Step S1007).

Then, the management device 300 extracts operation data to be determination data from the vehicle information storage part 340 on the basis of the execution date by the abnormality determination part 380 and inputs it to the abnormality determination model 375 (training part 370) (Step S1008).

Then, the abnormality determination part 380 outputs the output of the abnormality determination model 375 together with information indicating the range of operation data used as training data (Step S1009), and terminates the processing.

Figure 11A:
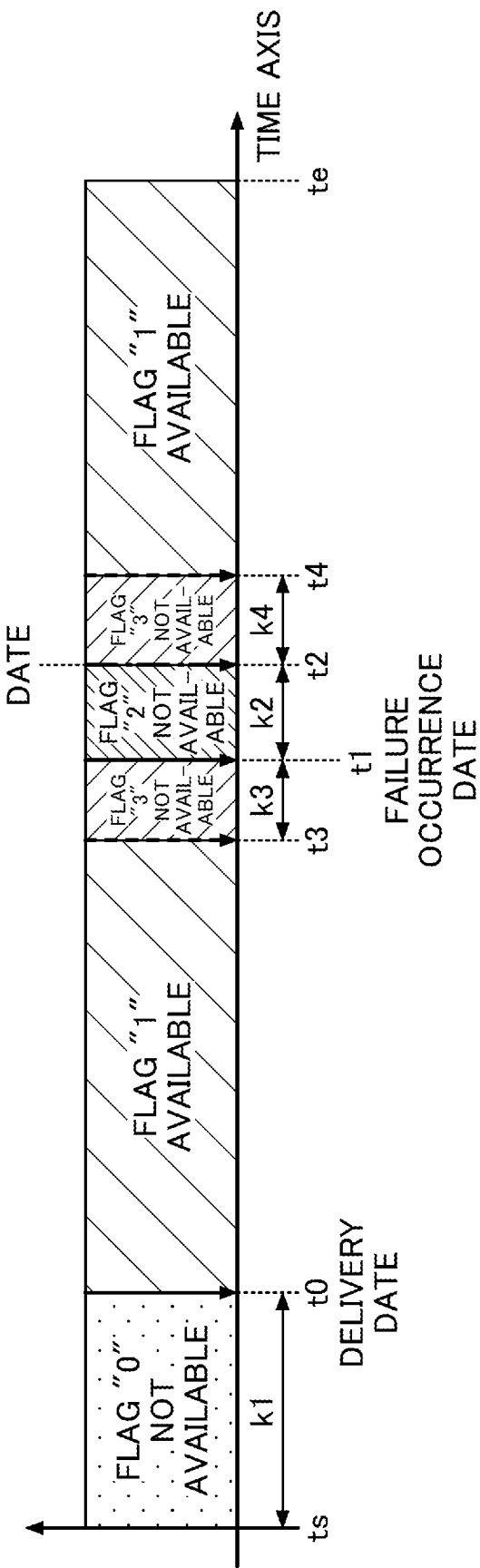
FIG. 11A is a first diagram illustrating the processing of a data range determination part.
Figure 11B:
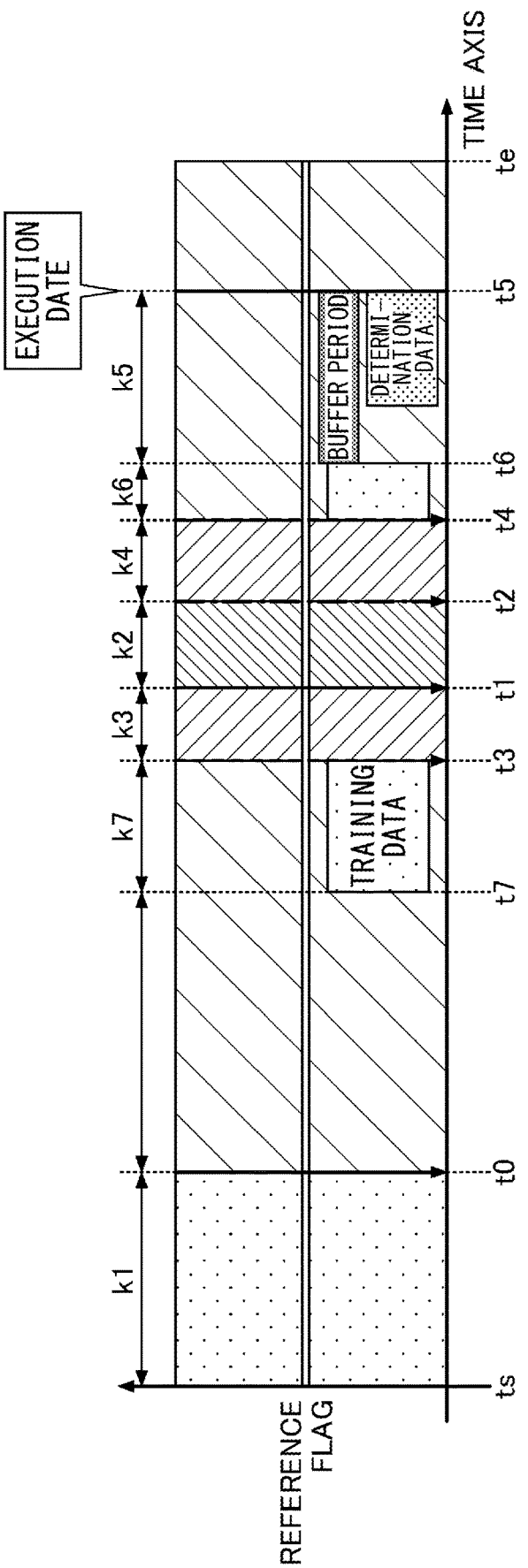
FIG. 11B is a second diagram illustrating the processing of the data range determination part.

The processing of the data range determination part 360 of the present embodiment will be further described below with reference to FIGS. 11A and 11B. FIG. 11A is a first diagram illustrating the processing of the data range determination part, and a diagram illustrating the first exclusion range and the second exclusion range. FIG. 11B is a second diagram illustrating the processing of the data range determination part and a diagram illustrating the range of training data.

In the examples of FIG. 11A and FIG. 11B, vehicle information including operation data for the period from period is to period to is extracted as a result of searching the vehicle information storage part 340 using the machine identification number received by the input acceptance part 361. The period may indicate the date. Therefore, the examples in FIG. 11A and FIG. 11B indicate that the operation data for the period from date ts to date to is extracted.

In the data range determination part 360 of the present embodiment, when the extracted vehicle information includes the delivery date t0, the reference flag assignment part 363 assigns a flag indicating that the period k1 from the date ts to the delivery date t0 is a period in which the operation data is not used as training data.

The operation data acquired during period k1 is information indicating the operation of the shovel 100 before the shovel 100 is delivered to the delivery location. In other words, the operation data acquired during period k1 is information indicating operations performed in an environment different from the delivery location. Therefore, in the present embodiment, the operation data acquired during the period k1 is not adopted as training data for abnormality determination performed after being carried to the delivery location.

Here, the reference flag assignment part 363 assigns a flag "0" to the period k1 indicating that it is a period before the delivery date and that the operation data is not to be used as training data.

Also, in the present embodiment, if the value of the item "Type of work" included in the vehicle information is "Repair operation", this operation data is not adopted as training data. Therefore, the reference flag assignment part 363 assigns a flag "0" indicating that the period does not use operation data as training data even for the period in which the type of work is "Repair operation".

In addition, when the extracted vehicle information includes the failure occurrence date t1 and the repair completion date t2, the reference flag assignment part 363 assigns a flag "2" indicating that the period is the repair period of the failure and the period does not use operation data as training data, with respect to the period k2 that is the period from the failure occurrence date t1 to the repair completion date t2.

In the present embodiment, the period during which the flag is assigned by the reference flag assignment part 363 is set as the first exclusion range. Therefore, the period k1 which is before the delivery of shovel 100 and the period k2 which is the repair period for the failure of shovel 100 are the first exclusion ranges in which operation data acquired during this period cannot be training data.

In addition, the reference flag assignment part 363 of the present embodiment assigns a flag "1" indicating that the period other than the period to which the flags "0" and "2" are assigned is the period in which the operation data can serve as the training data.

Next, the data range determination part 360 determines the second exclusion range by referring to the failure appearance period and the post-repair preliminary period stored in the parameter holding part 362 by the exclusion range determination part 364.

Specifically, the exclusion range determination part 364 specifies the date t3 back from the failure occurrence date t1 by the number of days set as the failure occurrence period, sets the period k3 (first period) from the date t3 to the failure occurrence date t1 as the second exclusion range, and assigns a flag "3" indicating the second exclusion range.

The exclusion range determination part 364 identifies the date t4 when the number of days set as the post-repair preliminary period has elapsed from the repair completion date t2, sets the period k4 (second period) from the repair completion date t2 to the date t4 as the second exclusion range, and assigns a flag "3" indicating the second exclusion range.

Thus, in the present embodiment, the second exclusion range is provided before the failure occurrence date and after the repair completion date included in the vehicle information.

Therefore, according to the present embodiment, even if the actual day when the failure occurred does not coincide with the day when the operator or the like of the shovel 100 reported the occurrence of the failure, the adoption of inappropriate operation data as training data can be suppressed.

In addition, according to the present embodiment, even when the date when the shovel 100 actually starts being operated as the shovel 100 was prior to the occurrence of the failure does not coincide with the date when the repair of the shovel 100 is completed, the adoption of inappropriate operation data as training data can be suppressed.

In the example of FIG. 11A, the operation data acquired during the period from date t0 to date t3 and the operation data acquired during the period from date t4 to date to are the data that can be the training data. That is, in the present embodiment, the operation data acquired during the period when the flag "1" is assigned can be the training data.

Next, the data range determination part 360 specifies the period in which the operation data is adopted as training data in the period in which the flag "1" is assigned by the adoption range determination part 365.

First, the adoption range determination part 365 refers to the parameter holding part 362 and specifies the date t6 that goes back the period k5 set as the buffer period from the execution date t5 of the abnormality determination processing accepted by the input acceptance part 361.

In the present embodiment, a predetermined amount of data including the operation data acquired on the execution date t5 is acquired as the determination data to be input to the abnormal determination model 375. In other words, the determination data is a predetermined number of operating data groups acquired immediately before the execution date t5.

Therefore, in the present embodiment, the period k5 is preferably longer than the period in which the determination data is acquired.

The buffer period may be set according to the type of abnormality. For example, the buffer period may be the same as the period for acquiring determination data when determining the presence or absence of an abnormality that appears as a sudden change in the operation data. In addition, for example, when determining the presence or absence of an abnormality that appears as a gradual change in the operation data, the buffer period is preferably longer than the period for acquiring the determination data.

Then, the adoption range determination part 365 specifies a period that is before the date t6, to which the flag "1" is assigned, and during which the number of acquired operation data becomes equal to or greater than the predetermined number. Then, the adoption range determination part 365 sets the operation data acquired during the specified period as training data. Here, a predetermined number indicates a sufficient number as training data. The number of operation data adopted as this training data may be set in advance.

In the example of FIG. 11B, there is a period k6 from date t4 to date t6 that is before date t6, to which the flag "1" has been assigned. However, in the example of FIG. 11B, the number of operation data acquired in period k6 is less than the predetermined number, which is not a sufficient amount of data for training data.

Therefore, the adoption range determination part 365 is before date t6, and identifies a period before date t3 which is a period to which the flag "1" is assigned. In this case, at this time, the adoption range determination part 365 specifies the period that is the period before the date t3 and the sum of the number of operating data acquired in the period k6 being equal to or greater than the predetermined number. In the example of FIG. 11B, the flag "1" is assigned and the period k7 from date t7 to date t3 is specified in addition to the period k6 as the period during which the number of acquired operation data is equal to or greater than the predetermined number.

Therefore, the data range determination part 360 outputs the operation data group acquired in each of the periods k6 and k7 to the training part 370 as training data. The training part 370 generates an abnormality determination model 375 based on the training data.

Thus, according to the present embodiment, the range of appropriate training data can be determined in the operation data collected from the shovel 100. In other words, according to the present embodiment, the training part 370 can train the relationship between the operation data and the presence or absence of the abnormality of the shovel using the appropriate training data (operation data). Next, an output example of the result of the abnormality determination processing by the abnormality determination part 380 will be described. The abnormality determination part 380 inputs a predetermined number of operation data groups including the operation data acquired on execution date t5 to the abnormality determination model 375 as determination data, and outputs the result of determining the presence or absence of an abnormality based on the output.

Figure 12A:
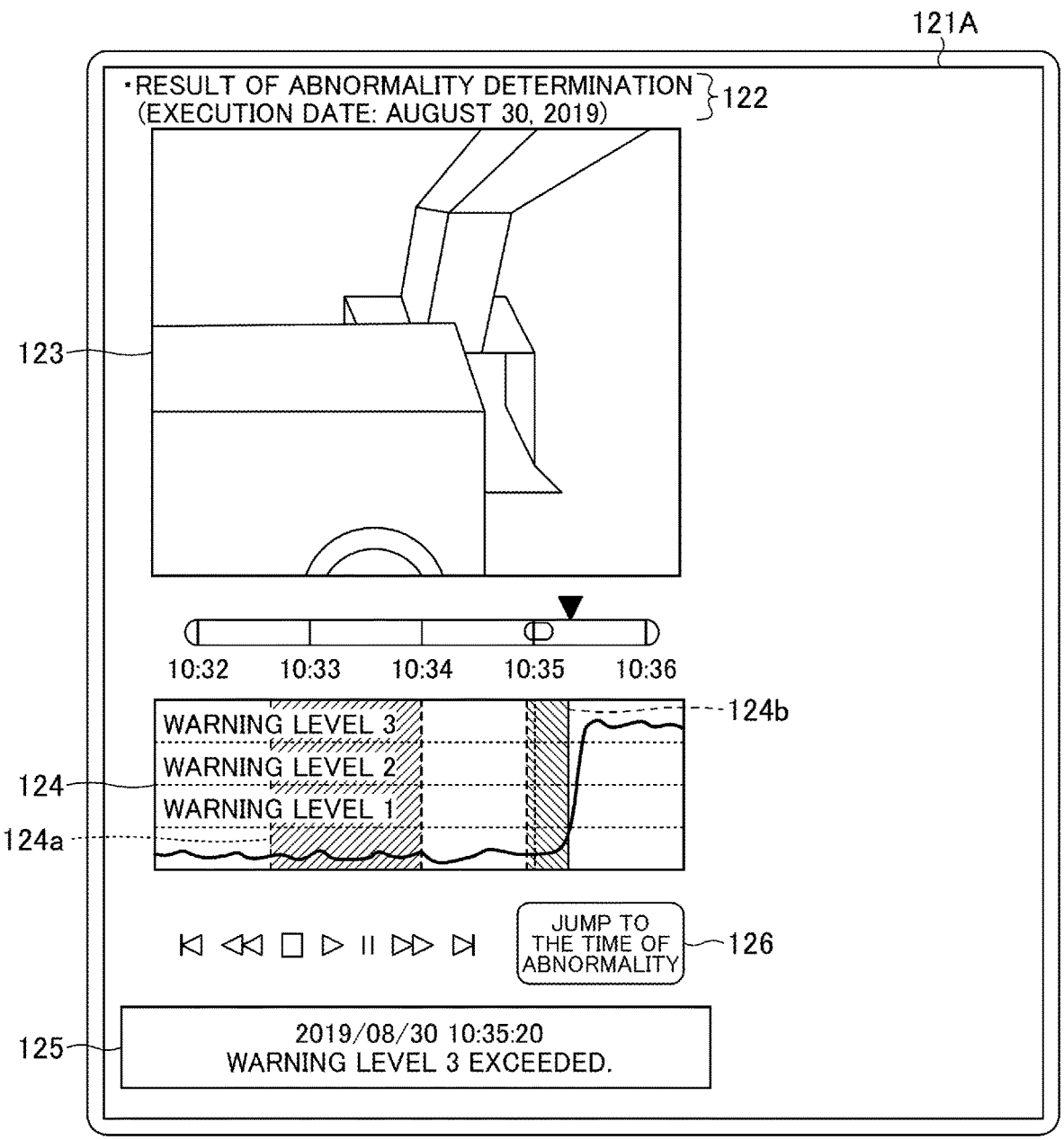
FIG. 12A is a first diagram illustrating an output example of a result of an abnormality determination.

FIG. 12A is a first diagram illustrating an output example of the result of abnormality determination, and FIG. 12B is a first diagram illustrating an output example of the result of abnormality determination. Screens 121A and 121B illustrated in FIGS. 12A and 12B, respectively, are displayed, for example, on a display 40 included in the management device 300.

The screen 121A includes display areas 122, 123, 124, 125, and 126. In the display area 122, a message indicating the result of the abnormal determination processing and information indicating the execution date of the abnormal determination processing are displayed.

In the display area 123, for example, a video captured by the imaging device 80 of the shovel 100 on the execution date is displayed.

In the display area 124 and the display area 125, for example, the result of determination of the presence or absence of an abnormality by the abnormality determination part 380 is displayed. The determination result of the presence or absence of the abnormality may be determined according to an index value or the like output from the abnormality determination model 375, for example. For example, in the present embodiment, it may be determined that there is an abnormality when the index value output from the abnormality determination model 375 is greater than a predetermined threshold. In the following explanation, the index value output from the abnormality determination model 375 may be expressed as an abnormality.

The display area 124 may display, for example, a graph or the like indicating variation in the degree of abnormality, and the display area 125 may display, for example, a message indicating the degree of abnormality. In the display area 126, an operation button or the like for playing a video or the like of a place where the degree of abnormality exceeds a predetermined threshold is displayed in the display area 123.

In the display area 124, a marker 124*a* indicating a training period in which operation data is adopted as training data and a marker 124*b* indicating an evaluation period in which operation data is adopted as determination data may be displayed in a graph indicating the variation in the degree of abnormality. In the display area 124, the markers 124*a* and 124*b* may have different display modes.

In the screen 121A, the variation of the degree of abnormality in the training period indicated by the marker 124*a* is small compared with the variation of the degree of abnormality in the evaluation period indicated by the marker 124*b*, and it can be seen that the operation data used for training was the normal operation data.

The screen 124B illustrated in FIG. 12B includes display areas 127 and 128. In the display area 127, information indicating the period in which the operation data adopted for the training data was acquired is displayed. In the display area 128, information indicating the periods excluded from the period for acquiring training data is displayed. In other words, information indicating the period during which the acquired operation data cannot be the training data is displayed in the display area 128.

Thus, in the present embodiment, the period during which the operation data was used is displayed as the training data used to generate the abnormality determination model 375. Therefore, according to the present embodiment, the period during which the training data is acquired can be visualized, and thus the worker can gain a greater understanding with respect to the result of the determination of the presence or absence of an abnormality.

In the present embodiment, the presence or absence of the abnormality is determined using the abnormality determination model 375 based on an appropriate range of training data, so the reliability of the determination result can be improved.

In the present embodiment, the operation data collected from the shovel 100 for which the presence or absence of an abnormality is determined is regarded as training data, but it is not limited to this. The training data may be adopted, for example, from operation data collected from other shovels other than the shovel 100 for which the presence or absence of an abnormality is to be determined. In this case, the other shovel may be the same model as the shovel 100 for which the presence or absence of an abnormality is to be determined.

In the present embodiment, the shovel 100 is used as a working machine for acquiring operation data as training data, but this is not limited to this. This embodiment can also be used for abnormality determination of working machines other than the shovel 100.

In the present embodiment, the abnormality determination model 375 outputs an index value of the presence or absence of an abnormality, and the abnormality determination part 380 determines the presence or absence of an abnormality based on the index value, but this is not limited. In the present embodiment, the abnormality determination model 375 may even determine the presence or absence of an abnormality.

In the present embodiment, the index value output by the abnormality determination model 375 may be output as the determination result of the presence or absence of an abnormality. In this case, the processing of the determination by the abnormality determination part 380 using the index value becomes unnecessary.

Other Embodiments

Other examples are described below with reference to the drawings. In the present embodiment, a data range determination part 360 compares the distribution of the operation data, which is regarded as training data, between the operation data acquired before the operation data acquired in the first exclusion range and the second exclusion range and the operation data acquired after the operation data acquired in the first exclusion range and the second exclusion range.

In the following explanation, operation data acquired before operation data acquired in the first and second exclusion ranges may be referred to as the first operation data, and operation data acquired after operation data acquired in the first and second exclusion ranges may be referred to as the second operation data.

In other words, in the present embodiment, the operation data acquired during period k7 may be expressed as the first operation data, and the operation data acquired during period k6 may be expressed as the second operation data.

In the present embodiment, if the distribution of the first operation data and the second operation data is different as a result of comparing the distributions, the first operation data is excluded from the training data.

Figure 13:
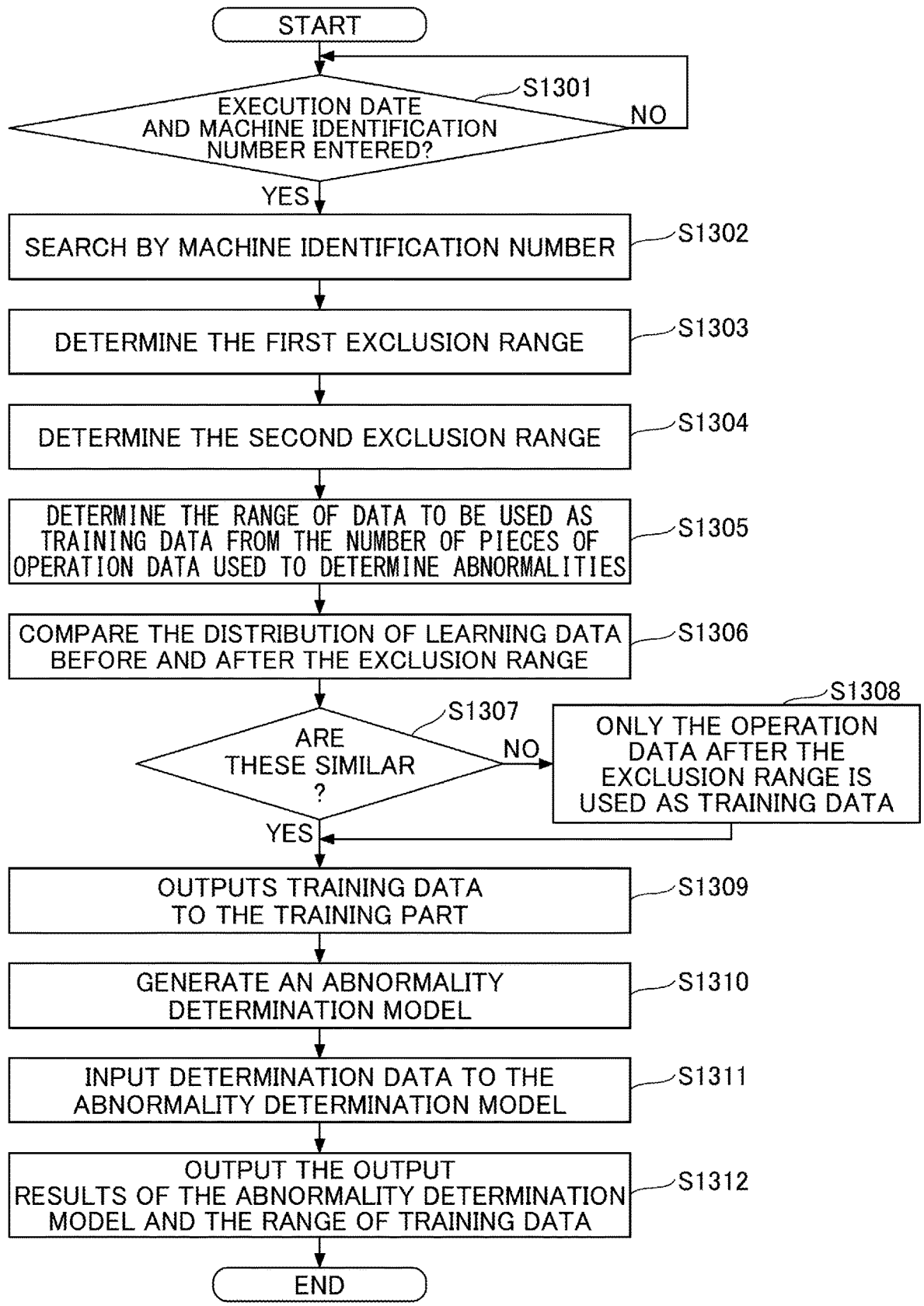
FIG. 13 is a flowchart illustrating the processing of the management device of another embodiment.

The operation of the management device 300 of the present embodiment will be described below with reference to FIG. 13. FIG. 13 is a flowchart illustrating the processing of the management device of another embodiment.

The processing from Step S1301 to Step S1305 in FIG. 13 is substantially the same to the processing from Step S1001 to Step S1005 in FIG. 10. Therefore, the explanation is omitted.

When the range of operation data to be adopted as the training data is determined in Step S1305 of FIG. 13, the adoption range determination part 365 compares the distribution of the first operation data with the distribution of the second operation data among the operation data adopted as the training data (Step S1306). The distribution of operation data may be indicated by, for example, feature quantities of operation data.

Then, the adoption range determination part 365 determines whether the two distributions are similar (Step S1307). Specifically, the adoption range determination part 365 may determine the similarity between the two and determine that the distribution of the first operation data and the distribution of the second operation data are similar when the similarity is equal to or greater than a predetermined threshold.

If it is determined in Step S1307 that they are similar, the management device 300 proceeds to Step S1309, which will be described later.

When it is determined in Step S1307 that they are not similar, the adoption range determination part 365 excludes the first operation data from the training data, sets the second operation data as the training data (Step S1308), and proceeds to Step S1309 described later. That is, when it is determined in Step S1307 that they are not similar, the adoption range determination part 365 sets the operation data acquired later than the operation data acquired in the first exclusion range and the second exclusion range as the training data.

The processing from Step S1309 to Step S1312 in FIG. 13 is substantially the same to the processing from Step S1006 to Step S1009 in FIG. 10. Therefore, the explanation is omitted.

The processing of FIG. 13 is specifically described below with reference to FIG. 11B. In the management device 300 of the present embodiment, the range of operation data adopted as training data is the operation data acquired in the periods k6 and k7.

In this case, in the present embodiment, the operation data acquired during period k7 is used as the first operation data, and the operation data acquired during period k6 is used as the second operation data, and the distributions of both are compared. When it is determined that the first operation data and the second operation data are not similar, the data range determination part 360 sets the operation data acquired during the period k6 as training data. In this case, the number of operating data acquired during period k6 is greater than the predetermined number.

In the present embodiment, the operation data before the repair when no abnormality occurs is compared with the operation data after the repair when no abnormality occurs, and both are adopted as training data only when they are similar.

Therefore, according to the present embodiment, even if the operation data at the time of the normal condition is changed due to a change in the operating environment due to repair (maintenance) or the like, the change is not affected. Therefore, according to the present embodiment, even after repair is completed (after maintenance is performed), the warning sign of failure can be properly detected.

Although the preferred examples of the present invention have been described in detail, the present invention is not limited to the examples described above, and various modifications and substitutions can be made to the examples without departing from the scope of the present invention.

The invention claimed is:

1. A shovel management device comprising:
   a hardware processor configured to
      generate an abnormality determination model that associates shovel operation data indicating an operation of a shovel with a degree of abnormality of the shovel by using, among the shovel operation data, operation data when the shovel is determined to be in a normal state as training data, the operation data corresponding to a period for determining presence or absence of the abnormality of the shovel,
      wherein the hardware processor is configured to, in determining the training data, determine a first range of the shovel operation data to be excluded from the training data based on vehicle information, the vehicle information including the shovel operation data and failure information regarding a failure of the shovel, and determine a second range of the shovel operation data to be used as the training data within the shovel operation data from which the first range is excluded, based on a time to execute a process of determining the presence or absence of the abnormality;
      extract determination data to be input to the generated abnormality determination model from the shovel operation data, based on the time to execute the process of determining the presence or absence of the abnormality;
      input the extracted determination data to the generated abnormality determination model to obtain an index value indicating the presence or absence of the abnormality as an output of the generated abnormality determination model; and
      determine the presence or absence of the abnormality based on the obtained index value,
   the hardware processor is configured to display a screen on a display, the screen including a first area in which a video captured by a camera of the shovel on a day of executing the process of determining the presence or absence of the abnormality is played, a second area in which a graph indicating variations in the obtained index value is displayed with a first marker indicating a period during which the operation data determined as the training data is acquired and a second marker indicating a period during which the determination data is acquired, and a third area in which a button for playing the video is displayed, and
   the hardware processor is configured to play a part of the video corresponding to a time at which the obtained index value exceeds a threshold, in response to the button being operated.

2. The shovel management device according to claim 1, wherein in executing the process of determining the presence or absence of the abnormality, there is an interval between the period during which the determination data is acquired and the period during which the operation data determined as the training data is acquired.

3. The shovel management device according to claim 1, wherein the first range of the shovel operation data to be excluded from the training data includes operation data acquired during a first period extending back for a predetermined period from a time of occurrence of the failure indicated by the failure information.

4. The shovel management device according to claim 3, wherein the first range of the shovel operation data to be excluded from the training data includes operation data acquired during a second period from a time of completion of a repair of the failure indicated by the failure information to a time at which another predetermined period elapses since the time of completion of the repair.

5. The shovel management device according to claim 4, wherein the hardware processor is configured to
compare first operation data acquired before the first period and second operation data acquired after the second period in the operation data among the shovel operation data in determining the training data, and
determine whether to exclude the first operation data from the training data according to a result of the comparison.

6. The shovel management device according to claim 5, wherein the hardware processor is configured to determine the first operation data and the second operation data as the training data in response to determining that the first operation data and the second operation data are similar as the result of the comparison.

7. The shovel management device according to claim 5, wherein the hardware processor is configured to exclude the first operation data from the training data in response to determining that a distribution of the first operation data and a distribution of the second operation data are different as the result of the comparison.

8. The shovel management device according to claim 1, wherein the failure information includes information indicating a date when a maintenance of the shovel is started and information indicating a date when the maintenance of the shovel is completed.

9. A shovel management system comprising:
the shovel management device as set forth in claim 1; and
a shovel support device configured to
accept an input of a start date of a maintenance of the shovel and a completion date of the maintenance of the shovel, and
notify the shovel management device of the start date and the completion date.

10. The shovel management system according to claim 9, wherein
the shovel support device includes
a start button to input the start date of the maintenance of the shovel; and
a completion button to input the completion date of the maintenance of the shovel.

11. A shovel management system comprising:
the shovel management device as set forth in claim 1; and
the shovel, the shovel including
a communication device configured to transmit the shovel operation data and information indicating a start date of a maintenance of the shovel and a completion date of the maintenance of the shovel to the shovel management device.

12. The shovel management system according to claim 11, wherein
the shovel further includes
a start switch to input the start date of the maintenance of the shovel; and
a completion switch to input the completion date of the maintenance of the shovel.

13. The shovel management system according to claim 12, wherein the shovel further includes another hardware processor configured to store, in a storage device, information indicating a record of when a person approaching within a predetermined range is detected by operation of the start switch in correspondence with information indicating that the approach is for the maintenance.

* * * * *